(12) United States Patent
Bedol et al.

(10) Patent No.: US 10,379,499 B2
(45) Date of Patent: *Aug. 13, 2019

(54) LIQUID POWERED DEVICE

(71) Applicant: Mark A. Bedol, Claremont, CA (US)

(72) Inventors: Mark A. Bedol, Claremont, CA (US); Robert D. Thompson, Baltimore, MD (US)

(73) Assignee: Mark A. Bedol, Claremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,246

(22) Filed: Oct. 5, 2018

(65) Prior Publication Data

US 2019/0049903 A1 Feb. 14, 2019

Related U.S. Application Data

(63) Continuation-in-part of application No. 15/915,344, filed on Mar. 8, 2018, now Pat. No. 10,095,188, and a continuation-in-part of application No. 14/208,617, filed on Mar. 13, 2014.

(51) Int. Cl.
| | |
|---|---|
| *H01M 2/36* | (2006.01) |
| *H01M 2/12* | (2006.01) |
| *G04C 10/00* | (2006.01) |
| *G04B 37/00* | (2006.01) |
| *H01M 6/32* | (2006.01) |
| *H01M 6/04* | (2006.01) |

(52) U.S. Cl.
CPC ......... *G04C 10/00* (2013.01); *G04B 37/0091* (2013.01); *H01M 2/1264* (2013.01); *H01M 2/361* (2013.01); *H01M 2/365* (2013.01); *H01M 6/04* (2013.01); *H01M 6/32* (2013.01); *H01M 2300/0002* (2013.01)

(58) Field of Classification Search
CPC .................................................. G04B 1/26–265
See application file for complete search history.

(56) References Cited

U.S. PATENT DOCUMENTS

| | | | | |
|---|---|---|---|---|
| 7,520,665 | B1* | 4/2009 | Nunes ................. | G04B 37/081 368/11 |
| 10,095,188 | B2* | 10/2018 | Bedol .................... | G04C 10/00 |
| 2007/0291592 | A1* | 12/2007 | Heineman ............. | G04C 11/00 368/46 |
| 2011/0176393 | A1* | 7/2011 | Wong .................... | G04C 10/02 368/204 |
| 2012/0018430 | A1* | 1/2012 | Bork .................. | B65D 51/1644 220/203.28 |

* cited by examiner

*Primary Examiner* — Edwin A. Leon
*Assistant Examiner* — Jason M Collins

(57) ABSTRACT

A liquid powered device, including a housing assembly configured to be worn on the wrist of a user. The housing assembly includes a front portion and a back portion. A liquid tank assembly is secured within the housing assembly. The liquid tank assembly has a fluid inlet. A power assembly is secured within the liquid tank assembly. An electronic module assembly is secured within the liquid tank assembly. The power assembly is in fluid communication with the fluid inlet to provide filling of the power assembly. The power assembly and the electronic module assembly are each separately liquid sealed. A pressure relief assembly is positioned within the liquid tank assembly for relief of undesired pressure therein.

12 Claims, 27 Drawing Sheets

LIQUID POWERED DEVICE

CROSS REFERENCE TO RELATED APPLICATIONS

This Application is a continuation-in-part of and claims priority of U.S. application Ser. No. 15/915,344, filed Mar. 8, 2018 entitled LIQUID POWERED WATCH.

U.S. application Ser. No. 15/915,344 is a continuation-in-part of and claims priority of U.S. application Ser. No. 14/208,617, filed Mar. 13, 2014 entitled LIQUID POWERED WATCH.

BACKGROUND OF THE INVENTION

1. Field of the Invention

The present invention relates to portable electrolyte powered devices and more particularly to a liquid powered device that utilizes a power assembly and electronic module assembly that are separately liquid sealed.

2. Description of the Related Art

Electrolyte solutions are known in the prior art for providing power to operate very low power consumption devices such as clocks and calculators. For example, Bedol International Group, Inc., Claremont, Calif., distributes a portable "Water Clock" that is operated by water. The Bedol "Water Clock" includes a cap that extends from an upper portion of the housing of the device.

Present co-inventor Mark A. Bedol is also a co-inventor of the invention disclosed in U.S. Ser. No. 29/313,579, filed on Jan. 23, 2009, entitled "Clock."

Present co-inventor Mark A. Bedol is also a co-inventor of the invention disclosed in U.S. Ser. No. 12/541,432, filed on Aug. 14, 2009, entitled "LIQUID POWERED ASSEMBLY."

SUMMARY OF THE INVENTION

In a broad aspect, the present invention is a liquid powered device, including a housing assembly configured to be worn on the wrist of a user. The housing assembly includes a front portion and a back portion. A liquid tank assembly is secured within the housing assembly. The liquid tank assembly has a fluid inlet. A power assembly is secured within the liquid tank assembly. An electronic module assembly is secured within the upper liquid seal member. The power assembly is in fluid communication with the fluid inlet to provide filling of the power assembly. The power assembly and the electronic module assembly are each separately liquid sealed. The back portion of the housing assembly includes a back plate connected to the liquid tank assembly.

In another broad aspect, the present invention is a liquid powered device, including a liquid tank assembly, the liquid tank assembly having a fluid inlet; a power assembly secured within the liquid tank assembly; a water tight sealed compartment connected to the liquid tank assembly, an electronic module assembly secured in the water tight compartment, wherein the power assembly is in fluid communication with the fluid inlet to provide filling of the power assembly; and, a mechanical clock mechanism operatively connected to the electronic module assembly, the mechanical clock mechanism including an hour hand and a minute hand, the mechanical clock mechanism not having a second hand. The liquid tank assembly, the power assembly, the electronic module assembly and the mechanical clock mechanism are cooperatively configured to operate without an external power source.

The present invention enables powering a wrist watch with water. In order for a watch to be usefully worn on a wrist, the electronics and mechanical elements of the watch need to be protected from being shorted from exposure to water. A watch user will in the course of use wash their hands, be exposed to rain or other climate elements, spill liquid by mistake or otherwise get their arms and hands wet. If the inner electronic or working mechanism of a watch is not protected, it will be shorted out from the water exposure. The present invention protects the electronic elements from the potential liquid exposure from the environment. It also protects electronic mechanisms from water exposure from its own power source, the water tank that is providing the power to run the watch. This unique double seal is a key and unique advantage that enables the liquid powered watch to be worn safely on a wrist.

U.S. Pat. No. 6,416,217, issued on Jul. 9, 2002 to H. Von Braunhaut, discloses an aquarium watch with a plug for filling the aquarium. The aquarium portion of the device is distinctly separate from the power supply and the electronic portion. The utility of the aquarium is not relevant to the utility of the watch mechanism. The watch works independently from its connection to the water in the aquarium.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
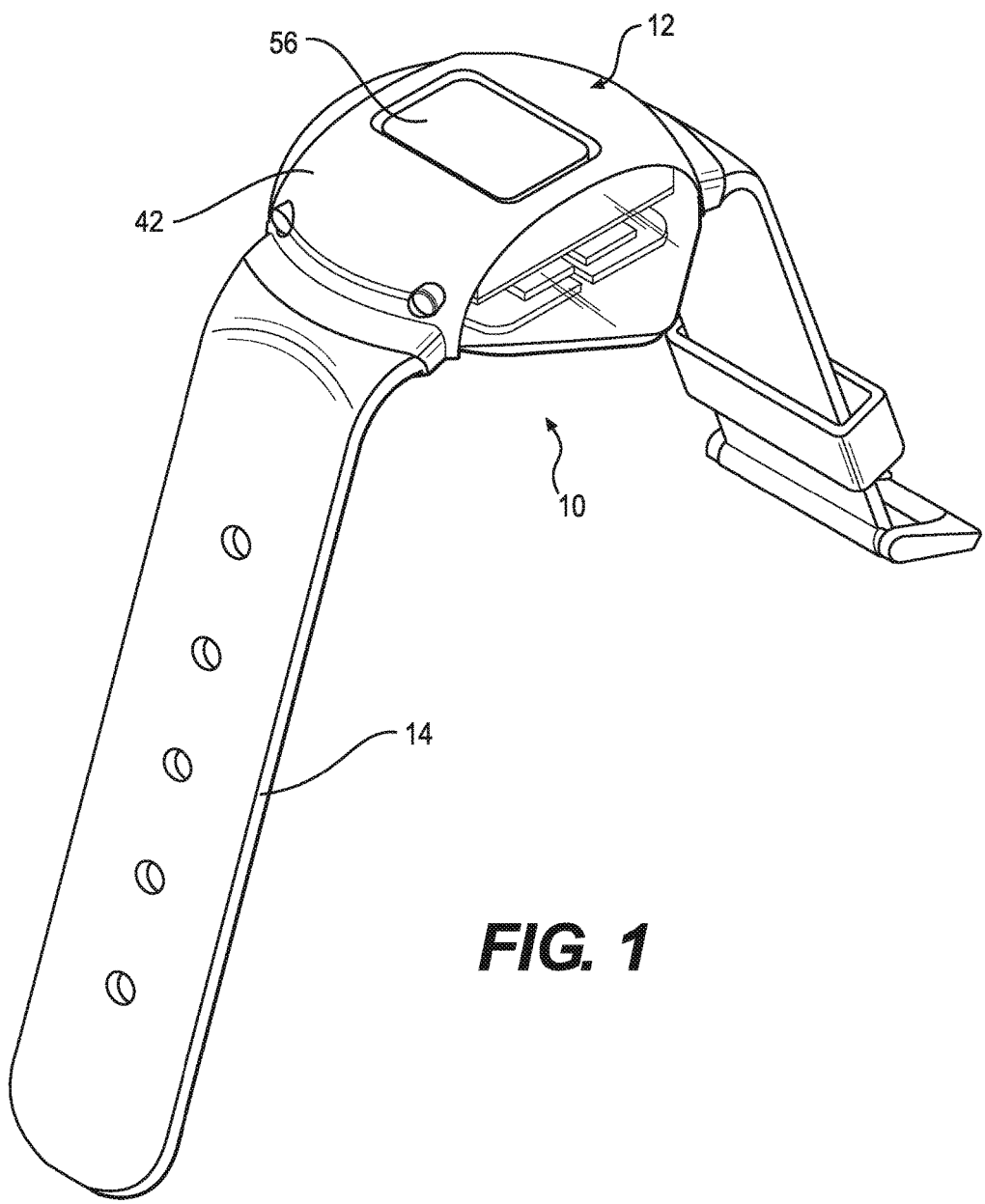
FIG. 1 is a perspective view of a first embodiment of the liquid powered device of the present invention.
Figure 2:
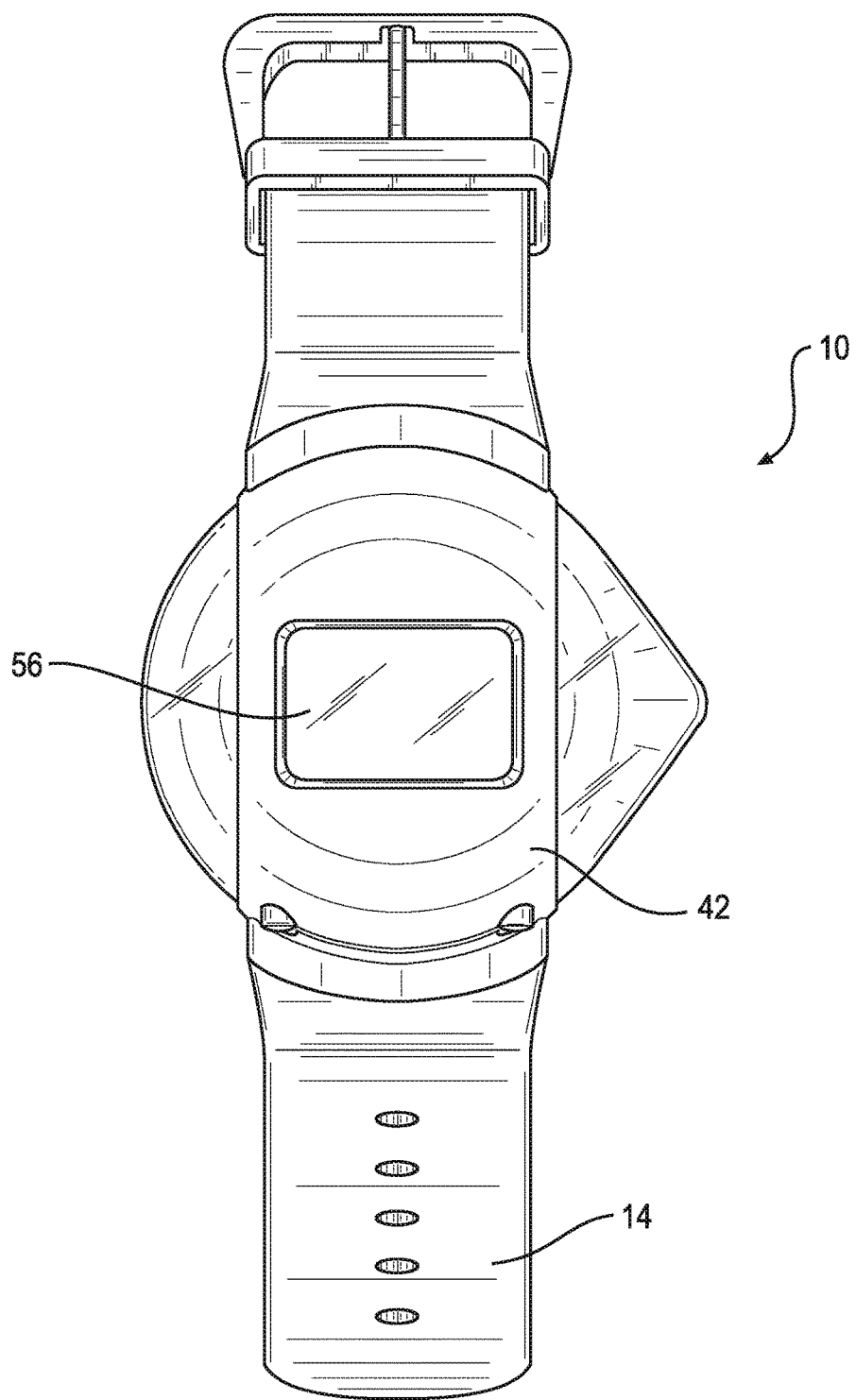
FIG. 2 is a top view of the liquid powered device of FIG. 1.
Figure 3:
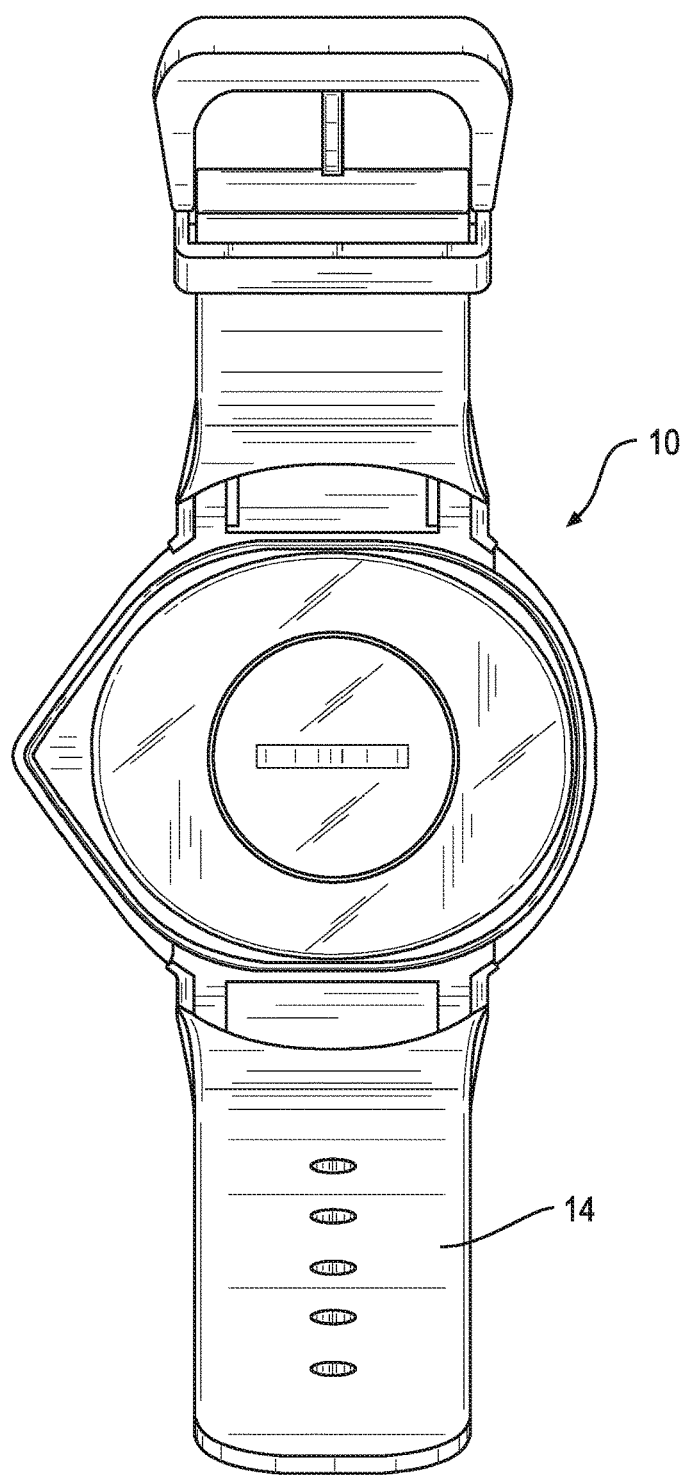
FIG. 3 is a bottom view of the liquid powered device of FIG. 1.
Figure 4:
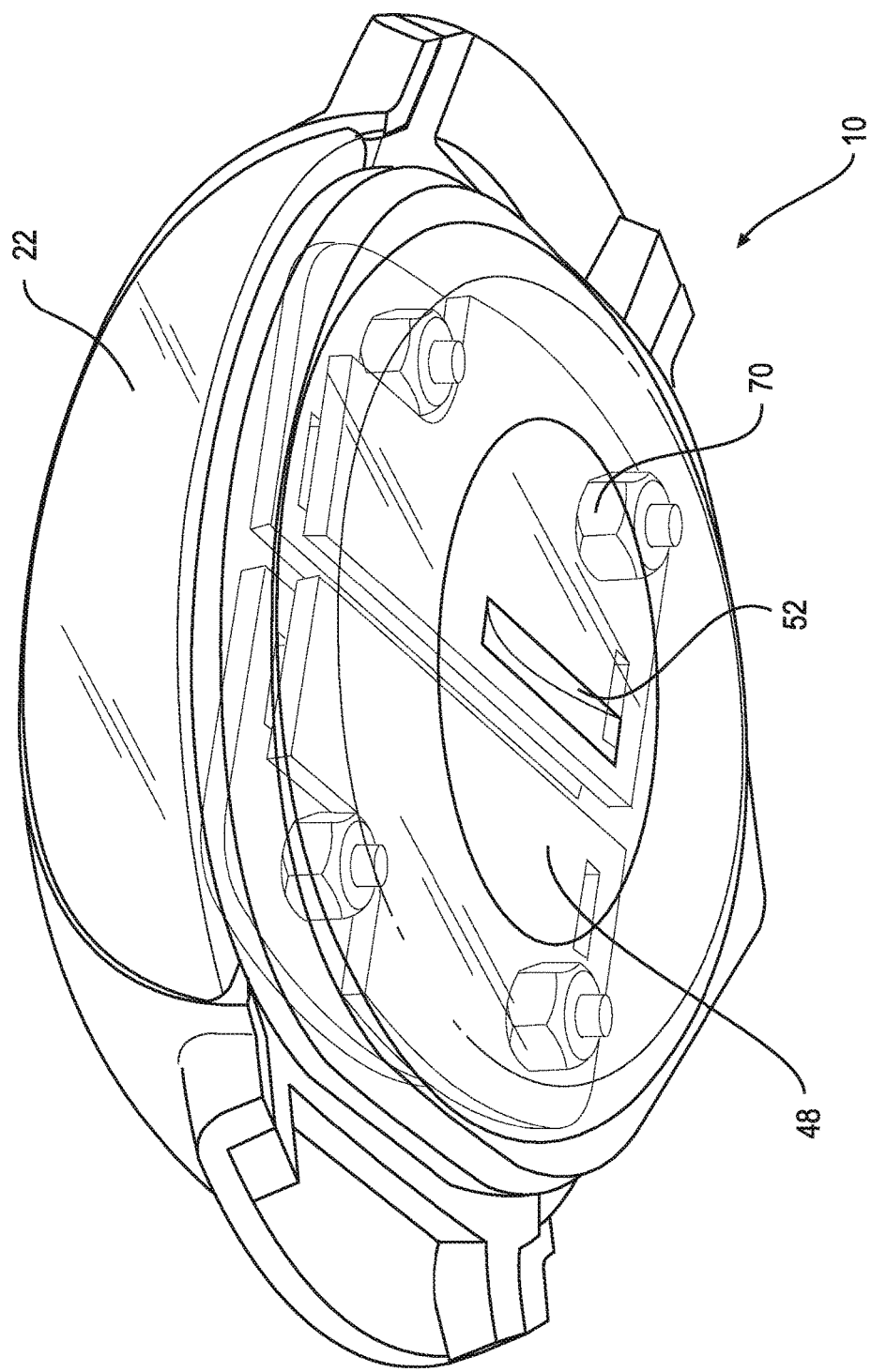
FIG. 4 is a bottom, side perspective view of the liquid powered device, shown with the wrist strap removed.
Figure 5:
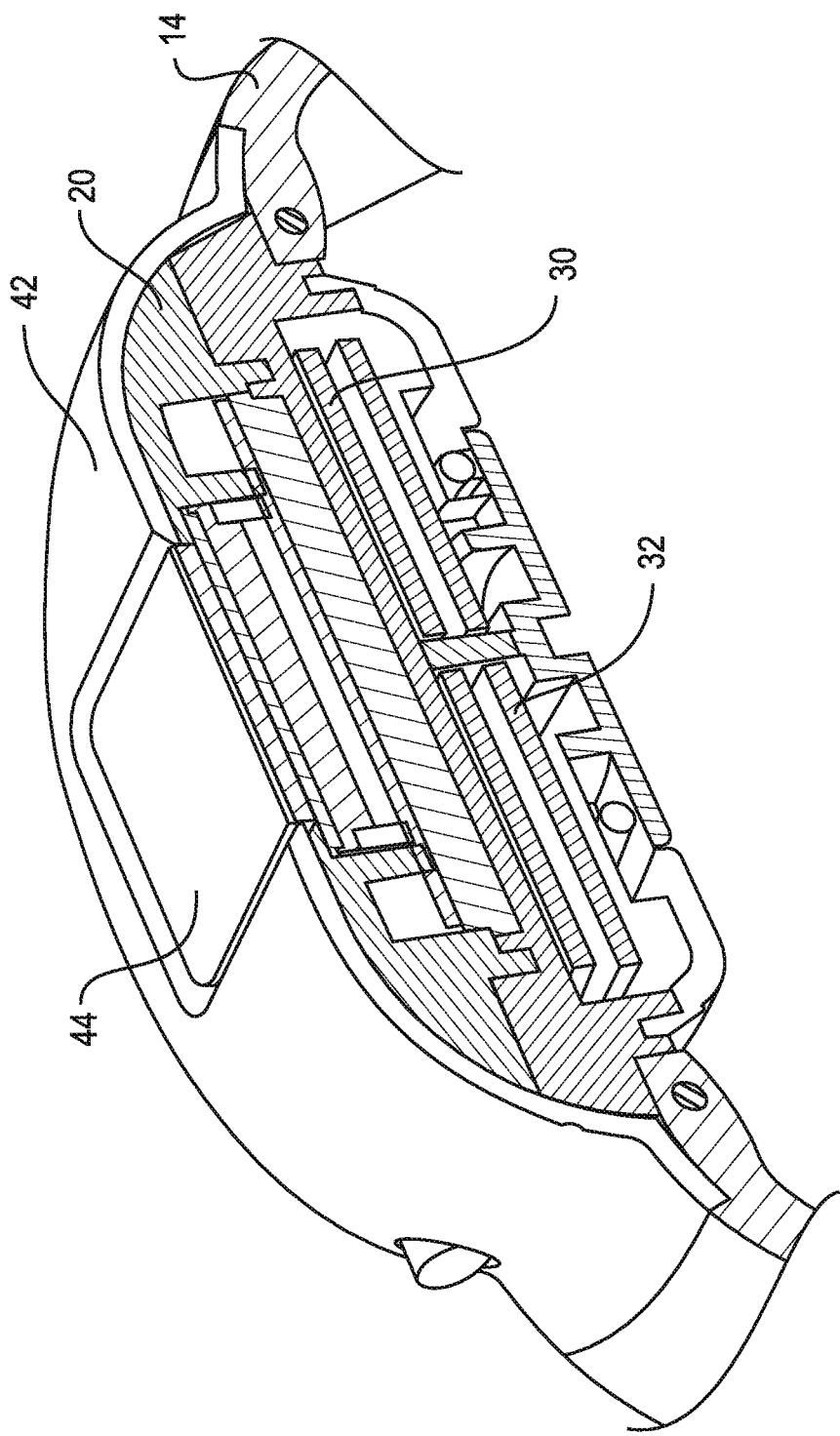
FIG. 5 is a top perspective view of the liquid powered device, shown cut away to reveal the internal components thereof.
Figure 6:
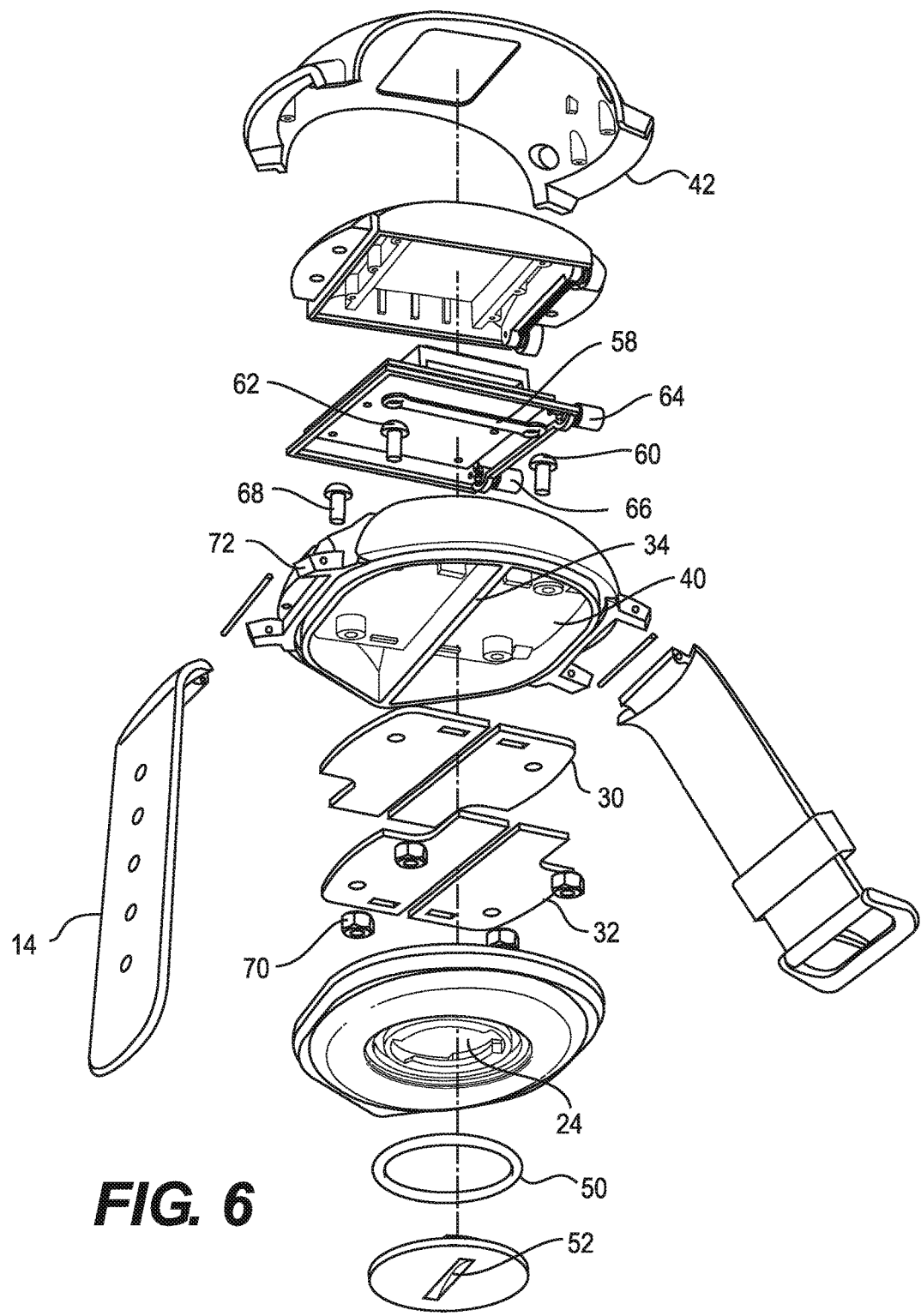
FIG. 6 is an exploded bottom perspective view of the liquid powered device.
Figure 7:
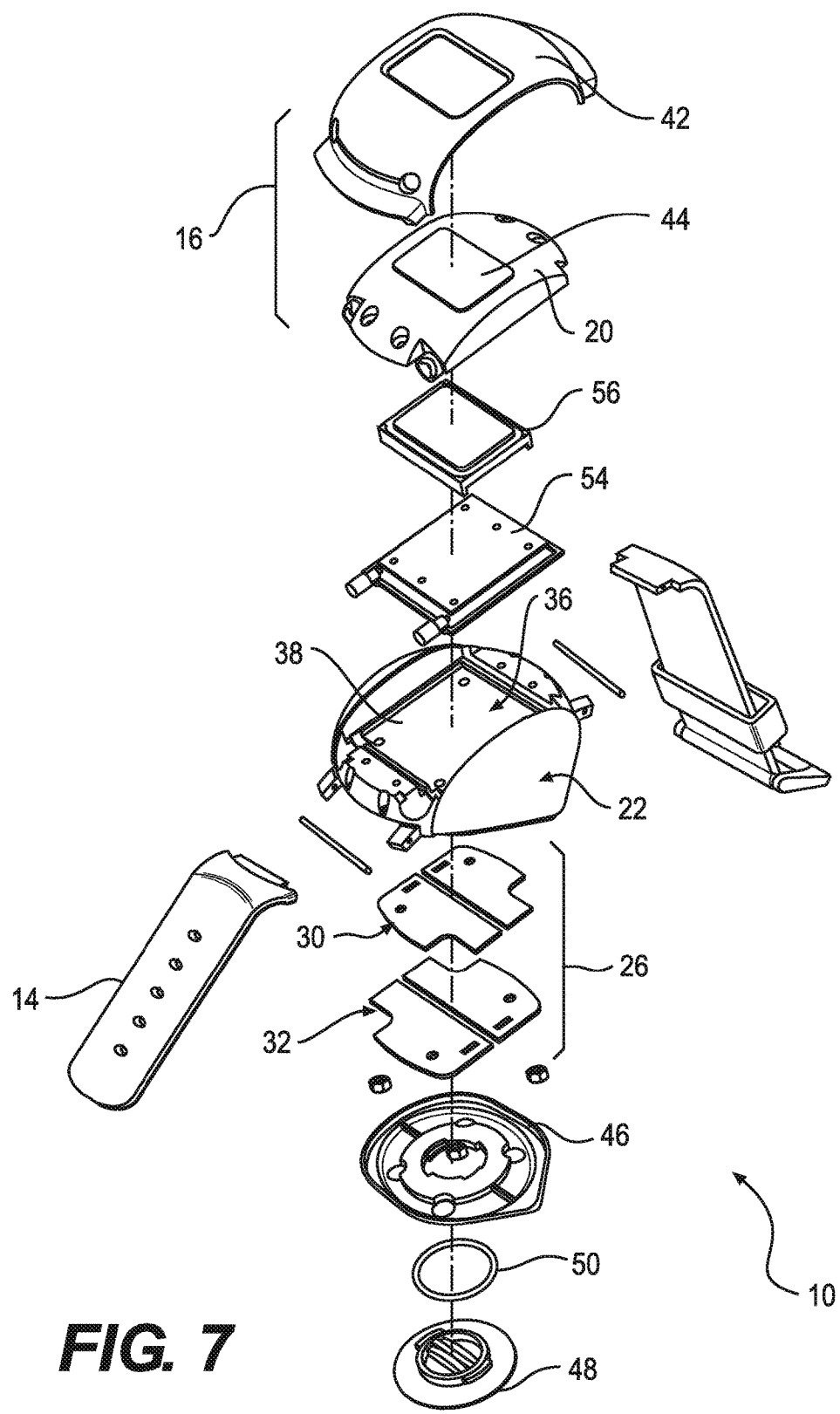
FIG. 7 is an exploded top perspective view of the liquid powered device.

Referring to the drawings and the characters of reference marked thereon, FIGS. 1-7 illustrate the liquid powered device, designated generally as 10. The device 10 includes a housing assembly, designated, generally as 12; that is configured to be worn on the wrist of a user via a wristband 14. The device 10 shown in this figure is embodied as a watch in this preferred embodiment. The housing assembly 12 includes a front portion 16 and a back portion 18. Although the housing assembly 12 is shown in the figures as being clear, it can be clear, semi-transparent or opaque. The front portion 16 includes an upper liquid seal member 20. A liquid tank assembly 22 is secured within the housing assembly 12. The liquid tank assembly 22 includes a fluid inlet 24. A power assembly 26 is secured within the liquid tank assembly 22. An electronic module assembly 28 is secured within the liquid tank assembly 22. The power assembly 26 is in fluid communication with the fluid inlet 24 to provide filling of the power assembly 26. The power assembly 26 and the electronic module assembly 28 are each separately liquid sealed.

The power assembly 26 includes two sets of metal elements 30, 32. Each set of metal elements is configured to produce an electrolyte charge. The two sets are divided into separate chambers to total two power cells. In each chamber, each set includes a pair of metallic elements that are polar opposites which react with electrolyte solution to generate an electric charge that can power the electronic module. Typically these elements or plates are formed of copper and zinc. Thus, during operation the device 10 is filled with an electrolyte solution 30 typically water. Thus, electricity is generated as well known by those familiar with liquid batteries.

The liquid tank assembly 22 includes a divider 34 for separating the metal elements of each respective set 30, 32 of metal elements. The upper liquid seal member 20 cooperates with an upper liquid seal portion 36 of the liquid tank assembly 22 to provide a sealing engagement there between. The liquid tank generally holds 1 teaspoon or 5 ml. of water.

The upper liquid seal portion 36 includes an upper sealing surface 38 and a lower sealing surface 40. The upper sealing surface 38 cooperates with the upper liquid seal member 20 for sealing the electronic module assembly 28. The lower sealing surface 40 cooperates with the back portion 18 for sealing the power assembly 26.

The manner of sealing is preferably ultrasonic sealing for both sealing the electronic module assembly 28 and sealing the power assembly 26. However, alternatively sealing by glue can be utilized.

The front portion 16 preferably includes a face plate 42 configured to encapsulate the upper liquid seal member 20. The upper liquid seal member 20 preferably includes a transparent viewing window 44.

The back portion 18 of the housing assembly 12 includes a back plate 46 connected to the liquid tank assembly 22, a water cap 48, and a washer 50 positioned between the back plate 46 and the water cap 48. The water cap 48 includes an indentation 52 for turning the water cap 48 for opening and closing the fluid inlet 24. Thus, in this preferred embodiment, the fluid inlet 24 is at the back portion 18 of the housing assembly 12. However, in alternate embodiments, the fluid inlet 24 may be formed at, for example, sidewalls of the liquid tank assembly 22.

The electronic module assembly 28 includes an electronic module element 54 operatively connected to a liquid crystal display (LCD) 56. The electronic module element 54 has a connecting plate 58 operatively connected at a back surface thereof. The power assembly 26 includes a pair of conducting screws 60, 62. Each set of metal elements 30, 32 is configured to produce an electrolyte charge. Each conductive screw 60, 62 of an associated set of metal elements 30, 32 is arranged and positioned to conduct electricity from its associated metal element to the connecting plate 58. The electronic module assembly 28 also includes a plurality of set buttons 64, 66.

Plate attachment screws/nuts 68, 70 attach the metal elements 30, 32 to the liquid tank assembly 22. Engagement elements 72 that extend from the sides of the liquid tank assembly 22 provide attachment of the wrist band 14.

Figure 13:
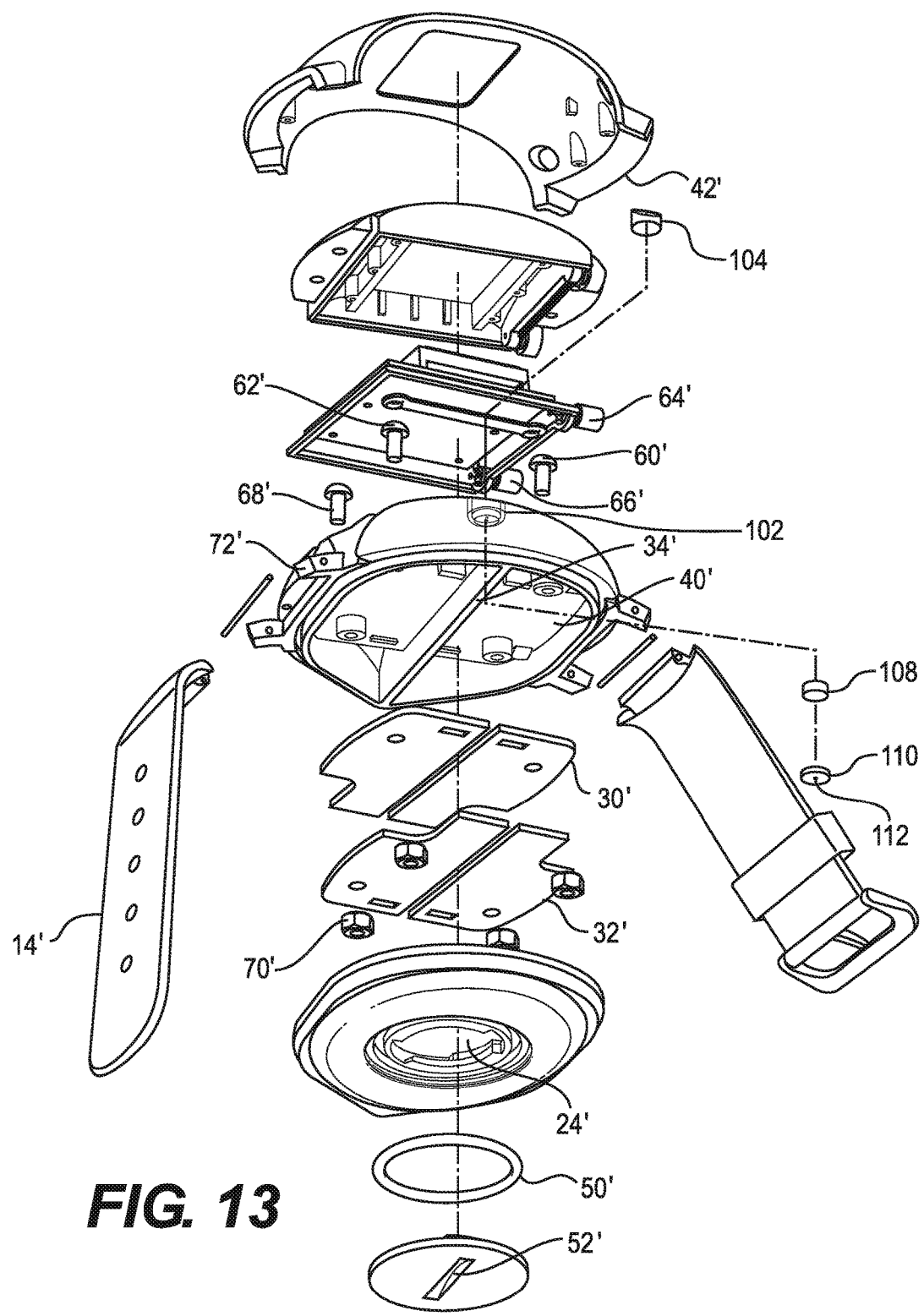
FIG. 13 is an exploded bottom perspective view of the liquid powered device of FIG. 8.
Figure 14:
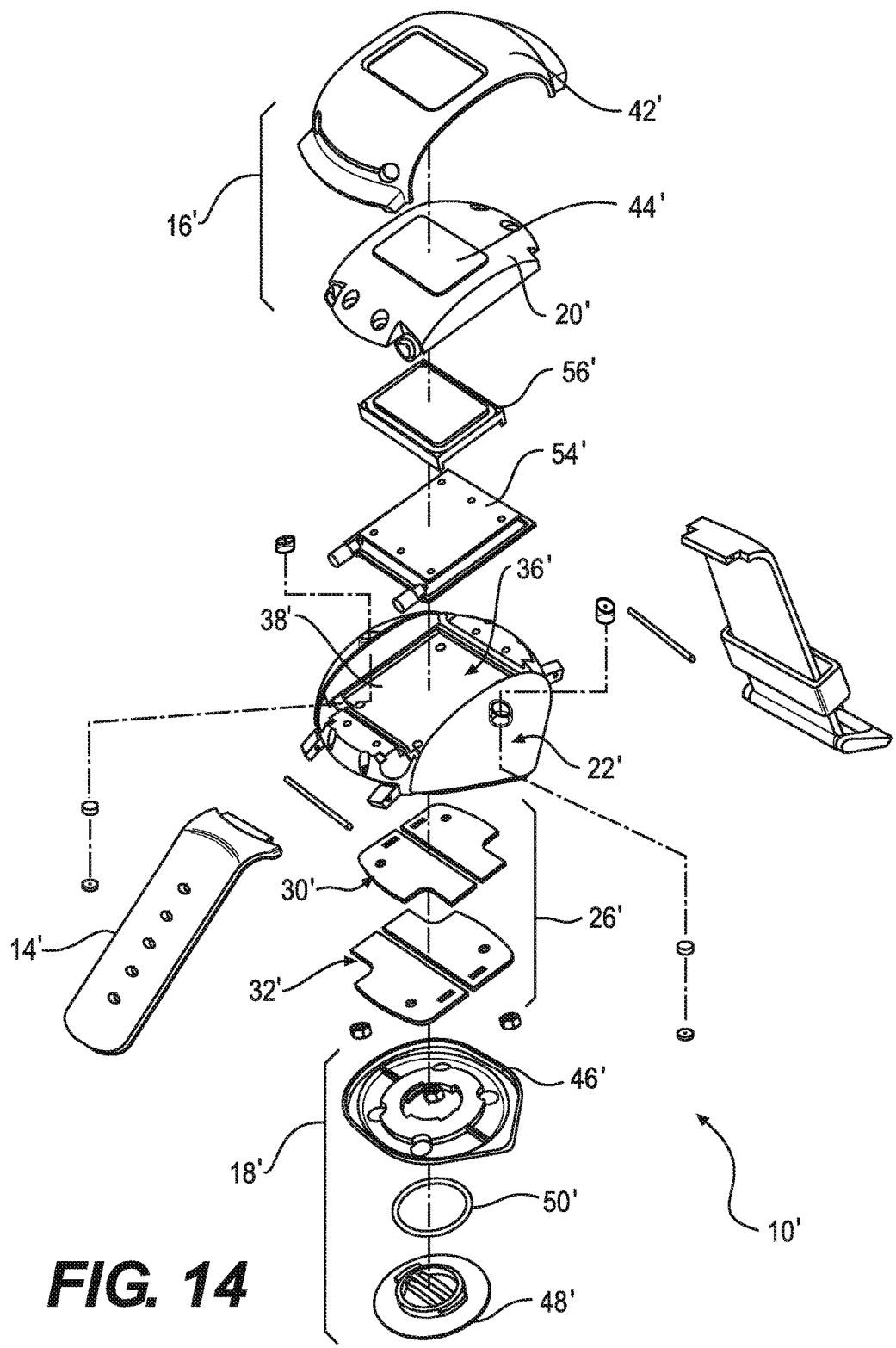
FIG. 14 is an exploded top perspective view of the liquid powered device of FIG. 8.
Figure 15:
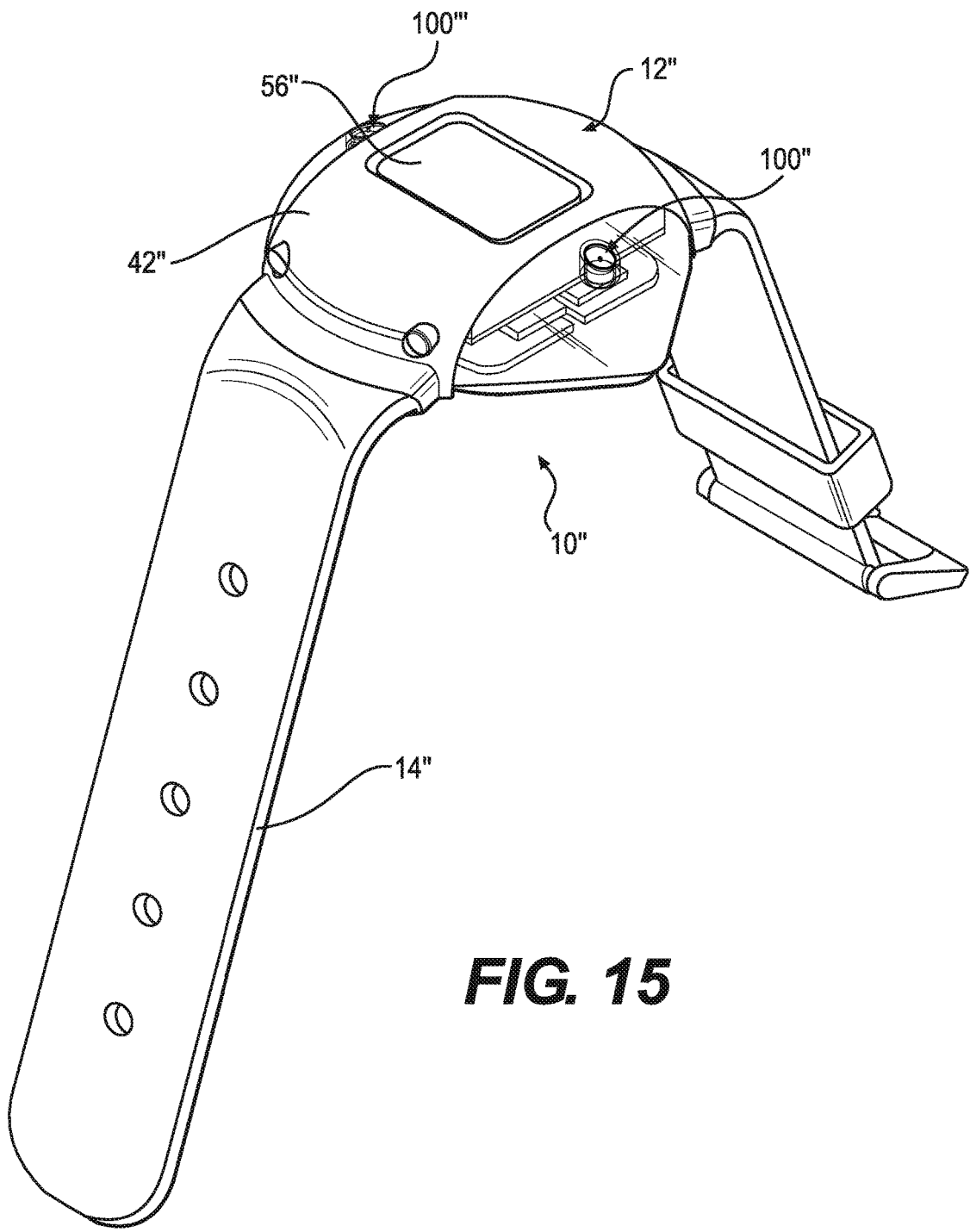
FIG. 15 is a perspective view of a third embodiment of the liquid powered device of the present invention which, as the FIG. 8 embodiment, utilizes a pressure relief assembly.

Referring now to FIGS. 8-14 a second embodiment of the liquid powered device of the present invention is illustrated, designated generally as 10', which utilizes two pressure relief assemblies 100, 100'. As can be seen in FIG. 13, each pressure relief assembly 100 includes a pressure relief housing 102. A pressure relief top cap 104 is attached to an upper end of the pressure relief housing 102. Each pressure relief top cap 104 has a top cap opening (i.e. air hole) 106 (see FIG. 8). A pressure relief element 108 is positioned within the pressure relief housing 102. The pressure relief element 108 can be, for example, sponge material, a semi porous material, a filament material such as that used as the tip of a highlighting marker, or other suitable materials that allow the air to escape from the liquid tank and neutralize the air pressure appropriately. This pressure discrepancy is a result of gasses generated as a natural byproduct of the electrolysis power system. Pressure build up should not be sufficient to break the liquid seal. The pressure relief assembly allows the gases to escape at a relatively low rate and allow the majority of the liquid to be maintained inside of the liquid tank. Without the sponge material and a hole in the liquid tank, liquid could rapidly be forced out of the liquid tank by gases that build up in the water tank. This would drain the liquid tank, therefore eliminating the power source, and potentially causing a water leak on to the user's wrist. The pressure relief assembly could eliminate some gases, for example, pressure relief top cap 104 transports gases from and into the liquid tank 22'. In other embodiments, the pressure relief top cap 104 could be formed to be the same part as the liquid tank assembly 22'. The pressure relief bottom cap 110 could be eliminated if the pressure relief element 108 is sized to be able to pressure fit onto the area in the tank that holds it so that it is held sufficiently with solely a pressure fit.

A pressure relief bottom cap 110 is positioned within the pressure relief housing 102. The pressure relief bottom cap 110 has a bottom cap opening 112.

Figure 8:
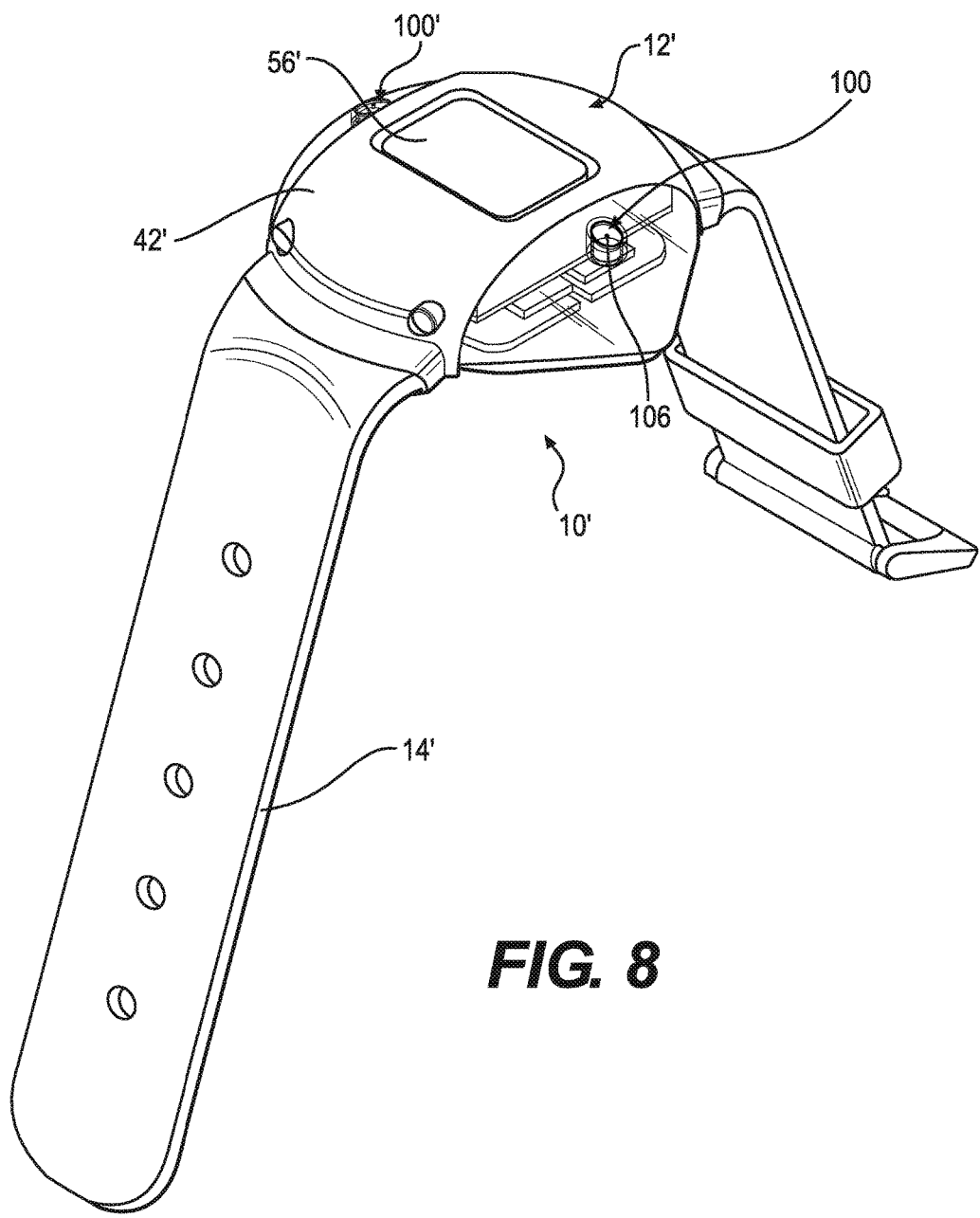
FIG. 8 is a perspective view of a second embodiment of the liquid powered device of the present invention which utilizes a pressure relief assembly.
Figure 9:
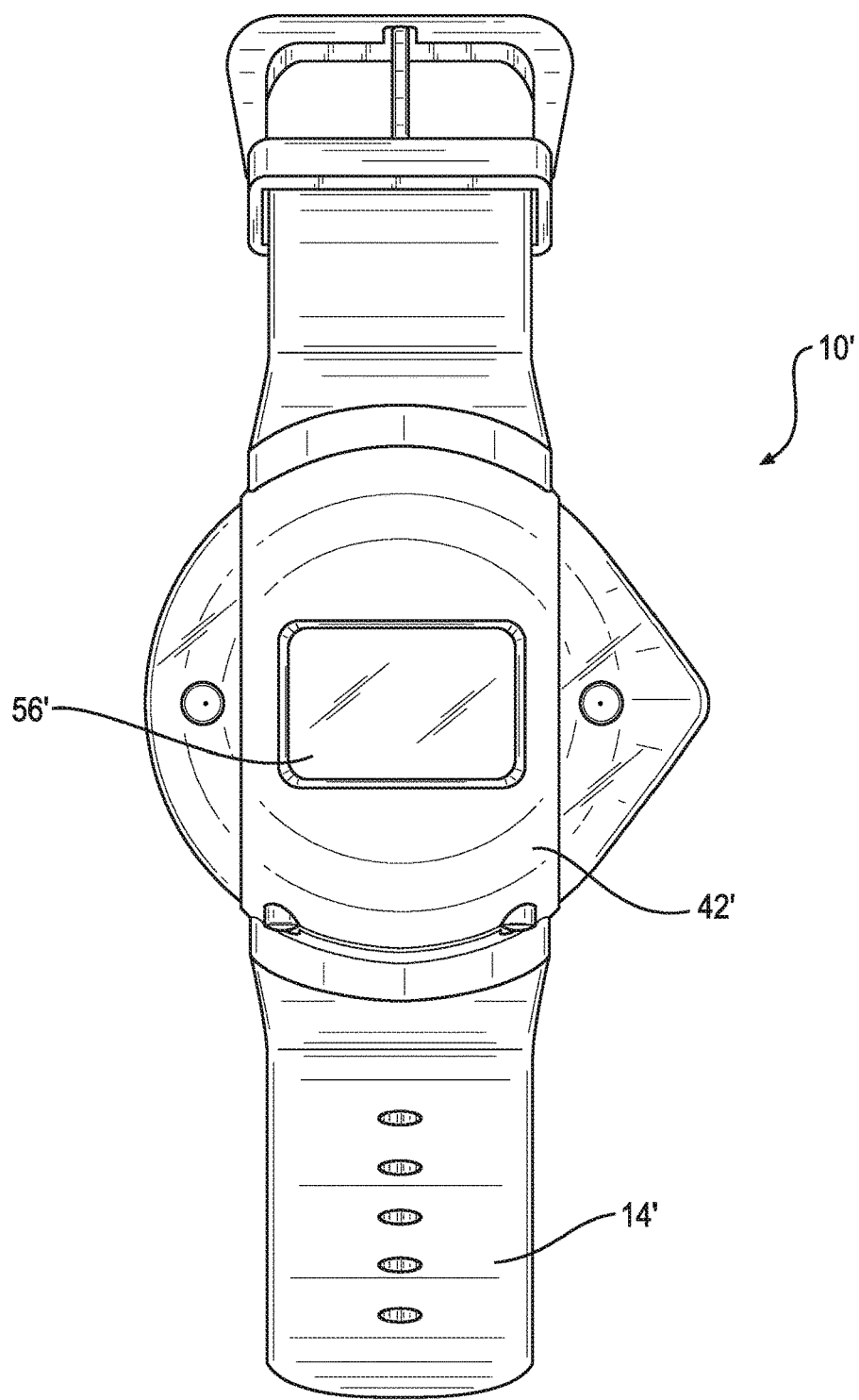
FIG. 9 is a top view of the liquid powered device of FIG. 8.
Figure 10:
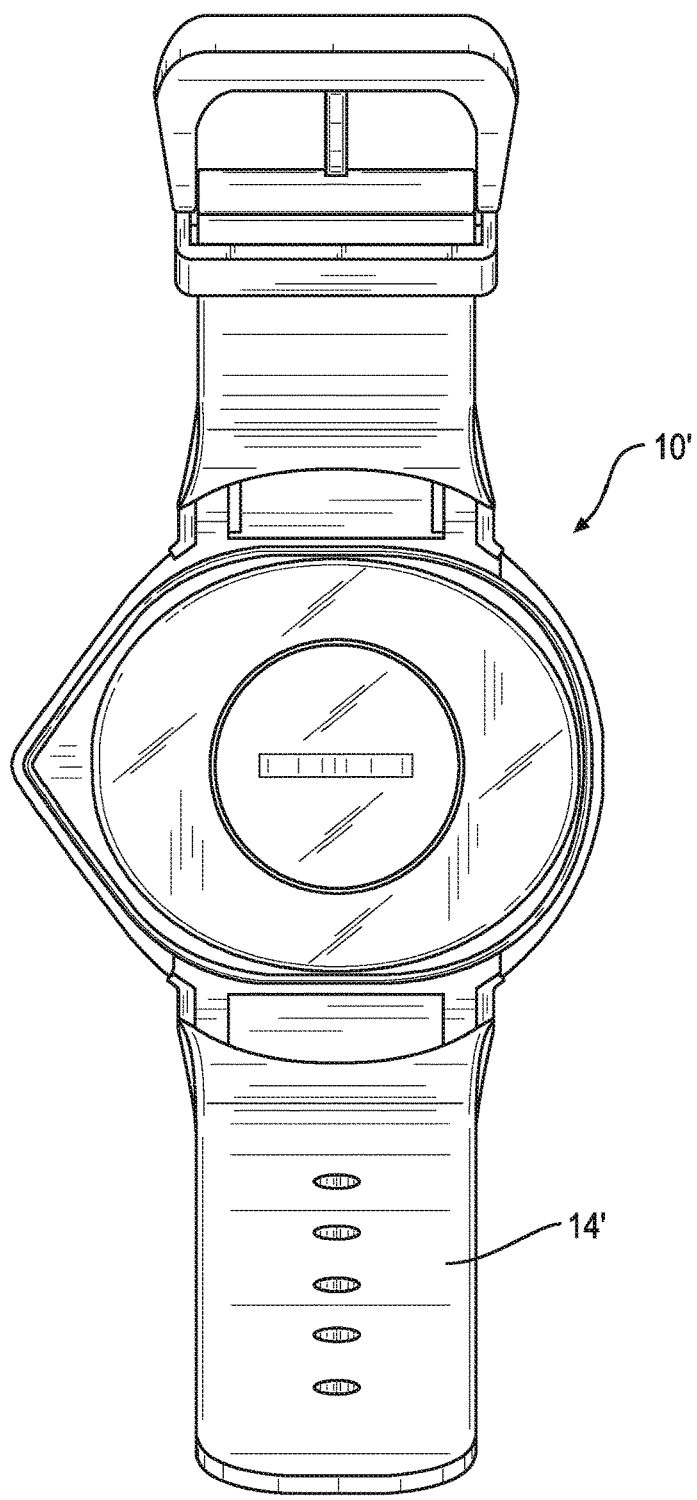
FIG. 10 is a bottom view of the liquid powered device of FIG. 8.
Figure 11:
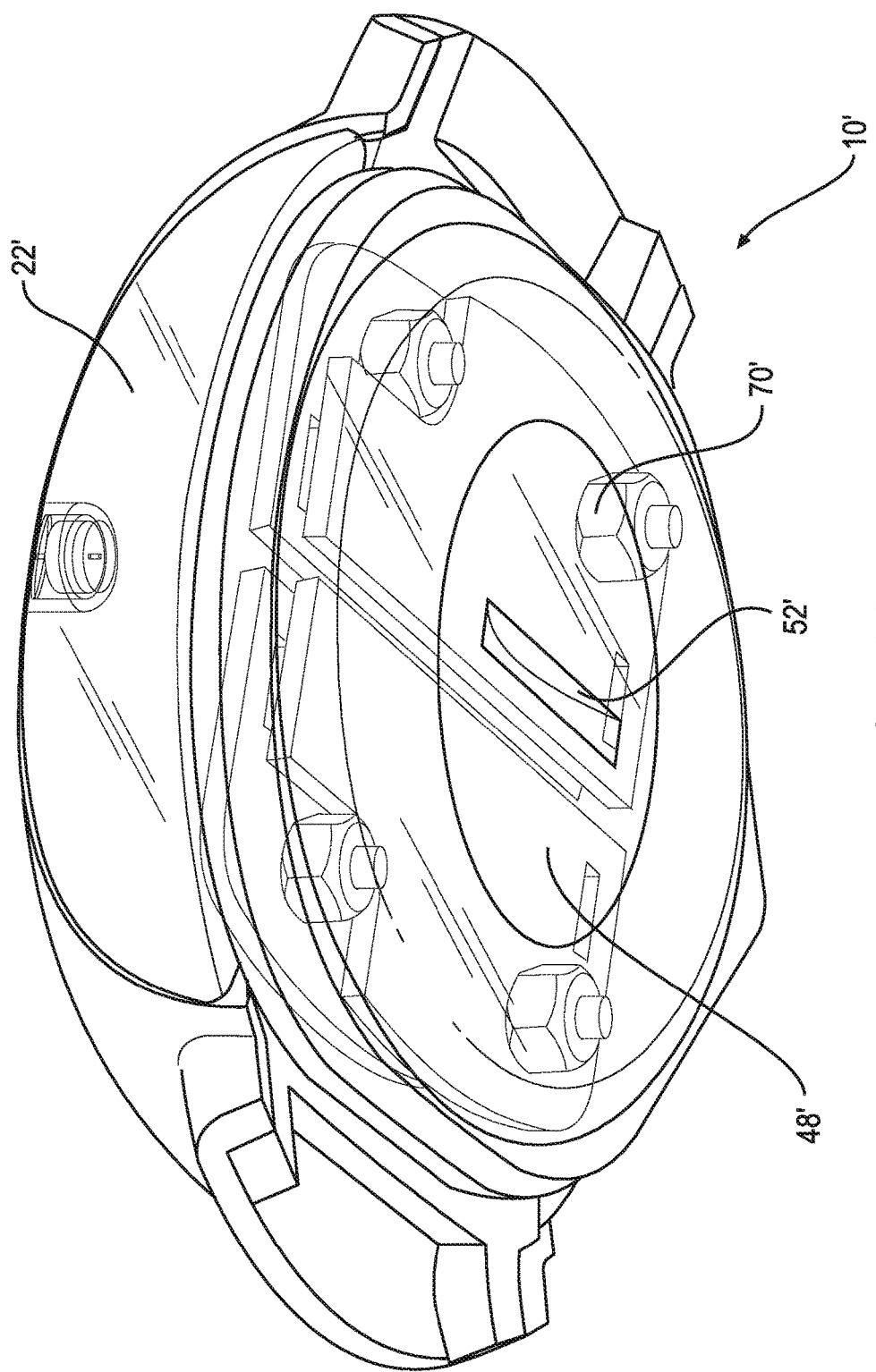
FIG. 11 is a bottom, side perspective view of the liquid powered device of FIG. 8, shown with the wrist strap removed.
Figure 12:
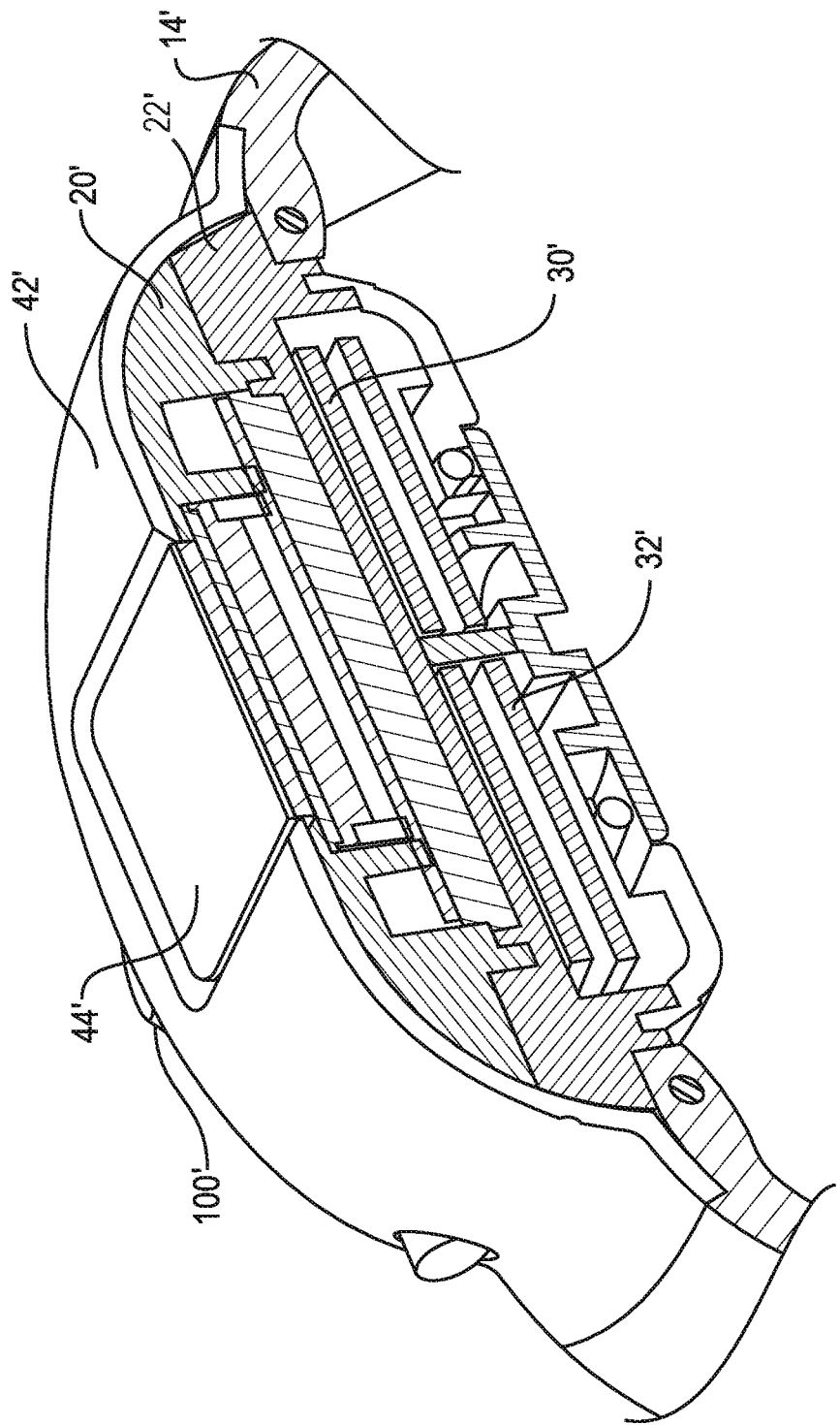
FIG. 12 is a top perspective view of the liquid powered device of FIG. 8, shown cut away to reveal the internal components thereof.

Referring now to FIGS. 15-22 a third embodiment of the liquid powered device of the present invention is illustrated, designated generally as 10", which, as the FIG. 8 embodiment, utilizes two pressure relief assemblies 100", 100'".

When you fill the water tank with liquid the clock turns on due to an electrolysis system that powers the clock. There a current that is transmitted to the electronics on the electronic circuit board using the wires 116 and the system creates energy and at the same time creates a reaction that generates gas that starts building up in the water chamber. The pressure from the gas build up is released using the pressure release assembly. The pressure relief assembly utilizes a semi porous membrane 108 to allow a slow release of gas to the outside. Without this filament having only a hole to allow the expelling of gas the water chamber would be emptied in a matter of a day or two. With the semi porous filament the clock will work for months before the liquid solution would be needed to be added to by refilling the water tank.

Figure 16:
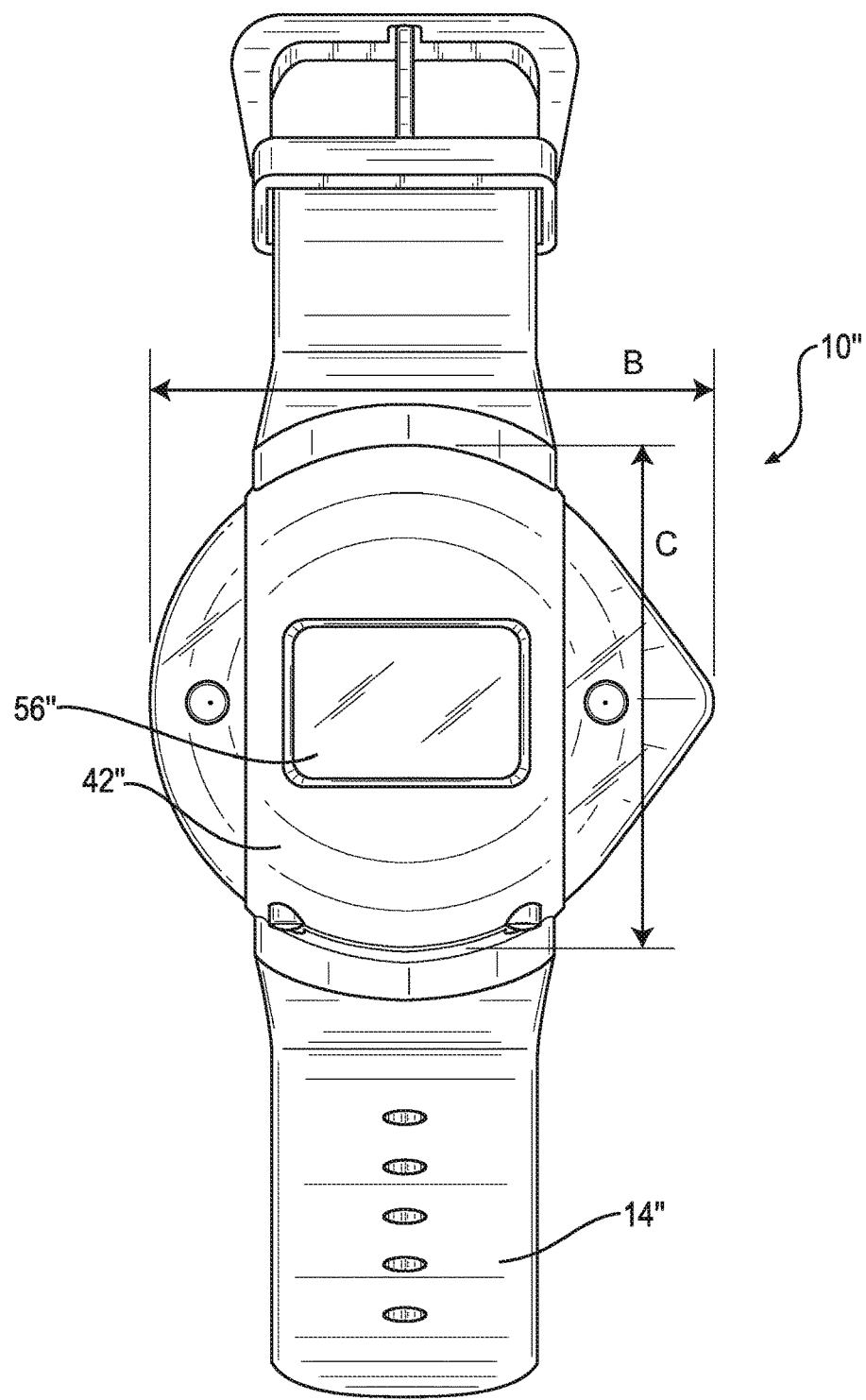
FIG. 16 is a top view of the liquid powered device of FIG. 15.
Figure 17:
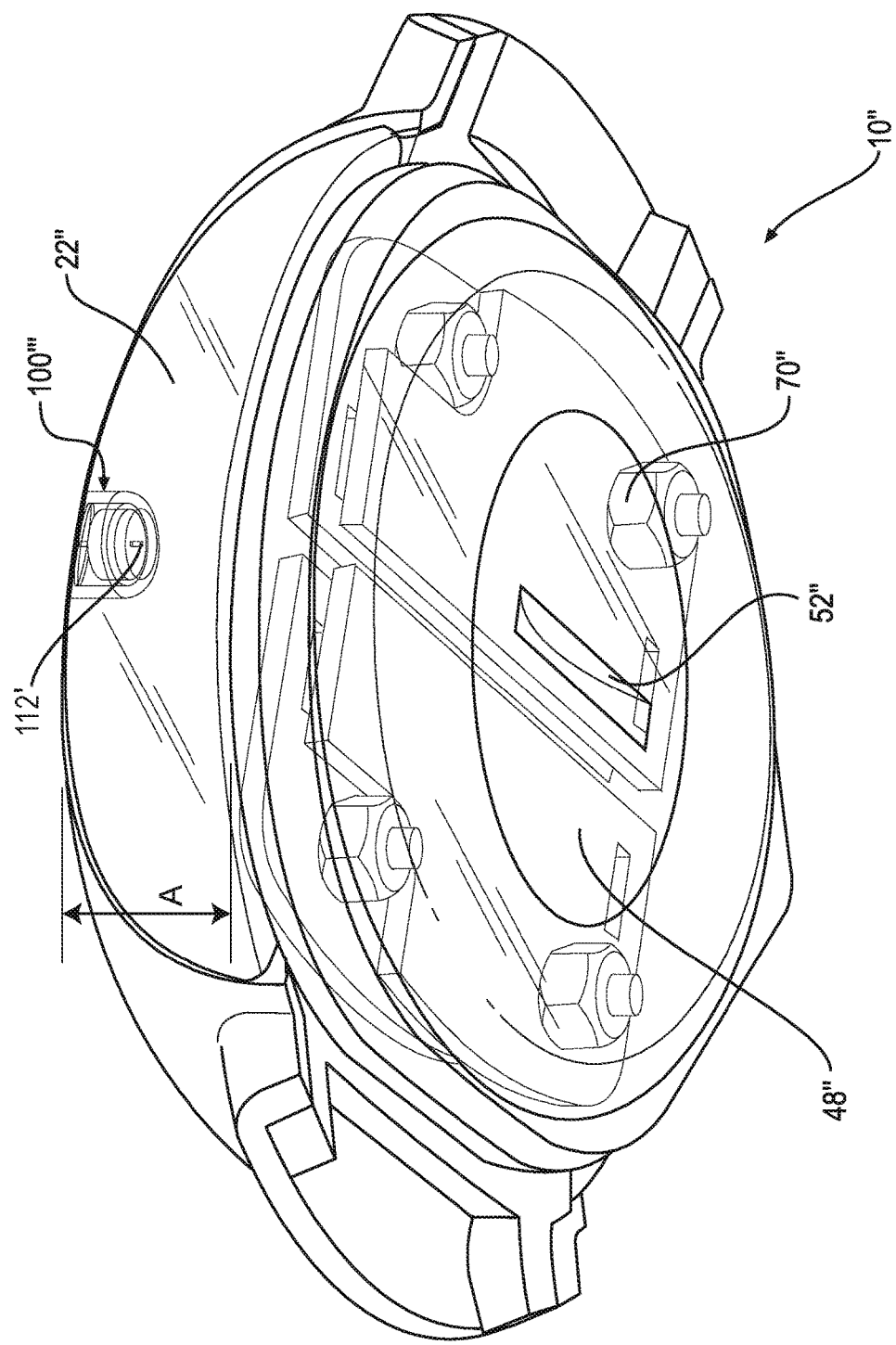
FIG. 17 is a bottom view of the liquid powered device of FIG. 15.

Because of the small liquid (i.e. water) tank capacity, and also due to the electrolysis reaction, there is a very limited amount of space for air to be in the liquid chamber along with the water. The air that is in the water tank is a small amount that remains after it is filled to capacity. The size of the liquid powered watch is important since there is a limited amount of size an item needs to be in order to be comfortably worn on a wrist. The liquid tank assembly is preferably one inch or less in thickness. The size of a typical water tank can be defined by the following parameters—length A, as shown in FIG. 17 is $^{11}/_{16}$"; and length B shown in FIG. 16 is 2". The Length C in FIG. 16 is 1½". The amount of water that will fill the watch to near-capacity is about 5 ml. (1 teaspoon) of liquid. (There is always a small amount of air left while filling, about the size of a small bubble, so we use the term "near-capacity".) Since the water tank is filled to its near-capacity, i.e. filling with as much liquid that can realistically be fit into the water tank, this limitation creates a high amount of pressure that needs to be released.

It is noted that the features of the present invention resulting in this air limitation are different than features of water powered devices of the prior art. Generally, tanks known in the prior art are large enough to store large volumes of water and leave room on the top of the water for a gas pocket that measures about one inch or more and air. Such tanks have no need to relieve gas pressure in the water tank because of their air volume. On the other hand, with the present invention the relatively small volume of the water tank and the small amount of air, results in pressure criticality. The clocks in the prior art have water tanks that hold on the order of ounces of water, not milliliters of water such as the present invention. And, the way the clocks in the prior art work is that they teach not filling the water container to the full capacity much less near the full liquid capacity. They instruct not to fill the liquid tank to full capacity since doing so would cause the gas that is produced from the electrolysis power system to build up to such an extreme that there would be a burst of water into the electronic chamber where the electronic circuit board is housed. The pressure relief valve of the present invention solves the problem that pressure ruptures the seal, causing water to leak into the electronics generating a short circuit and leakage of water.

Figure 18:
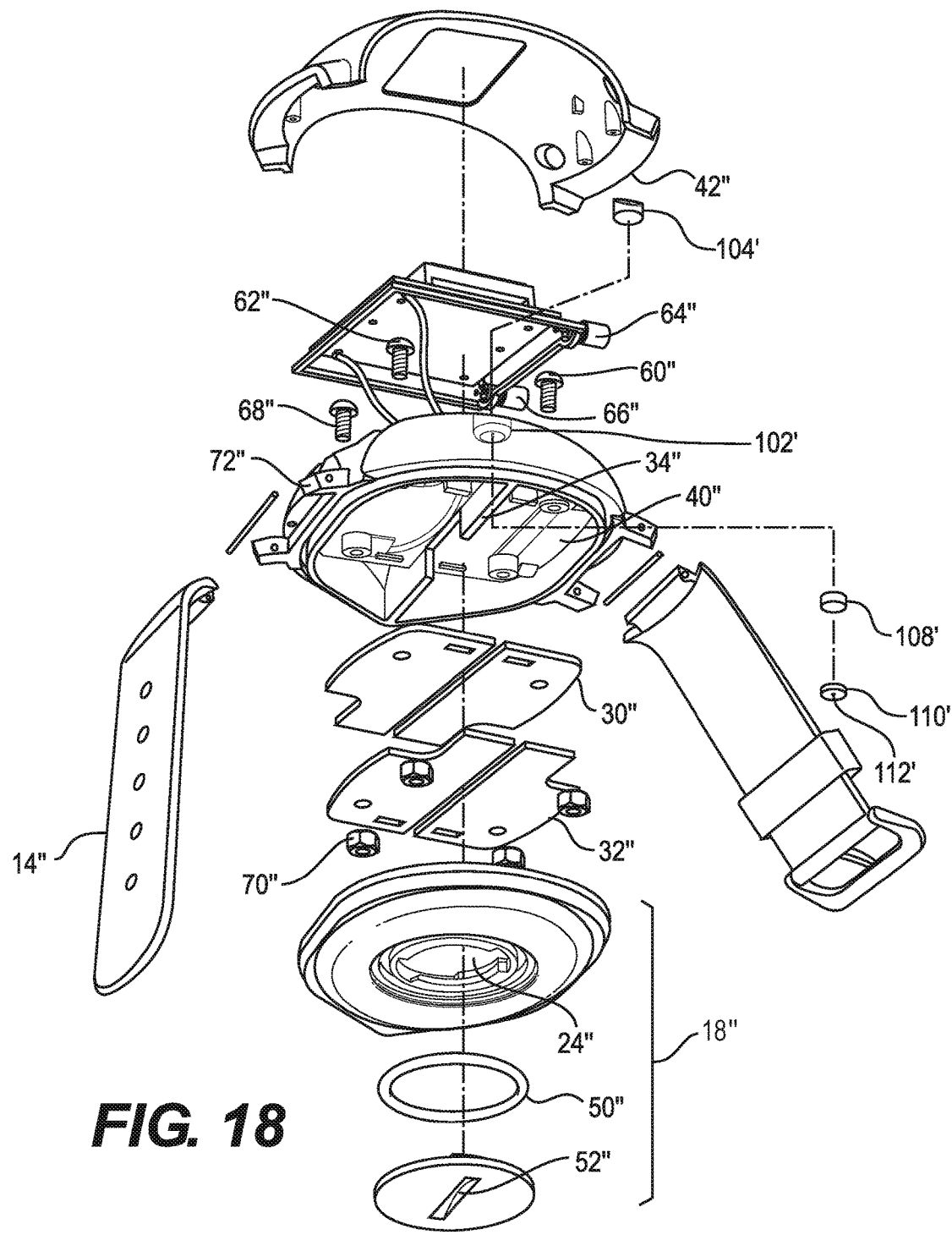
FIG. 18 is a bottom, side perspective view of the liquid powered device of FIG. 15, shown with the wrist strap removed.
Figure 19:
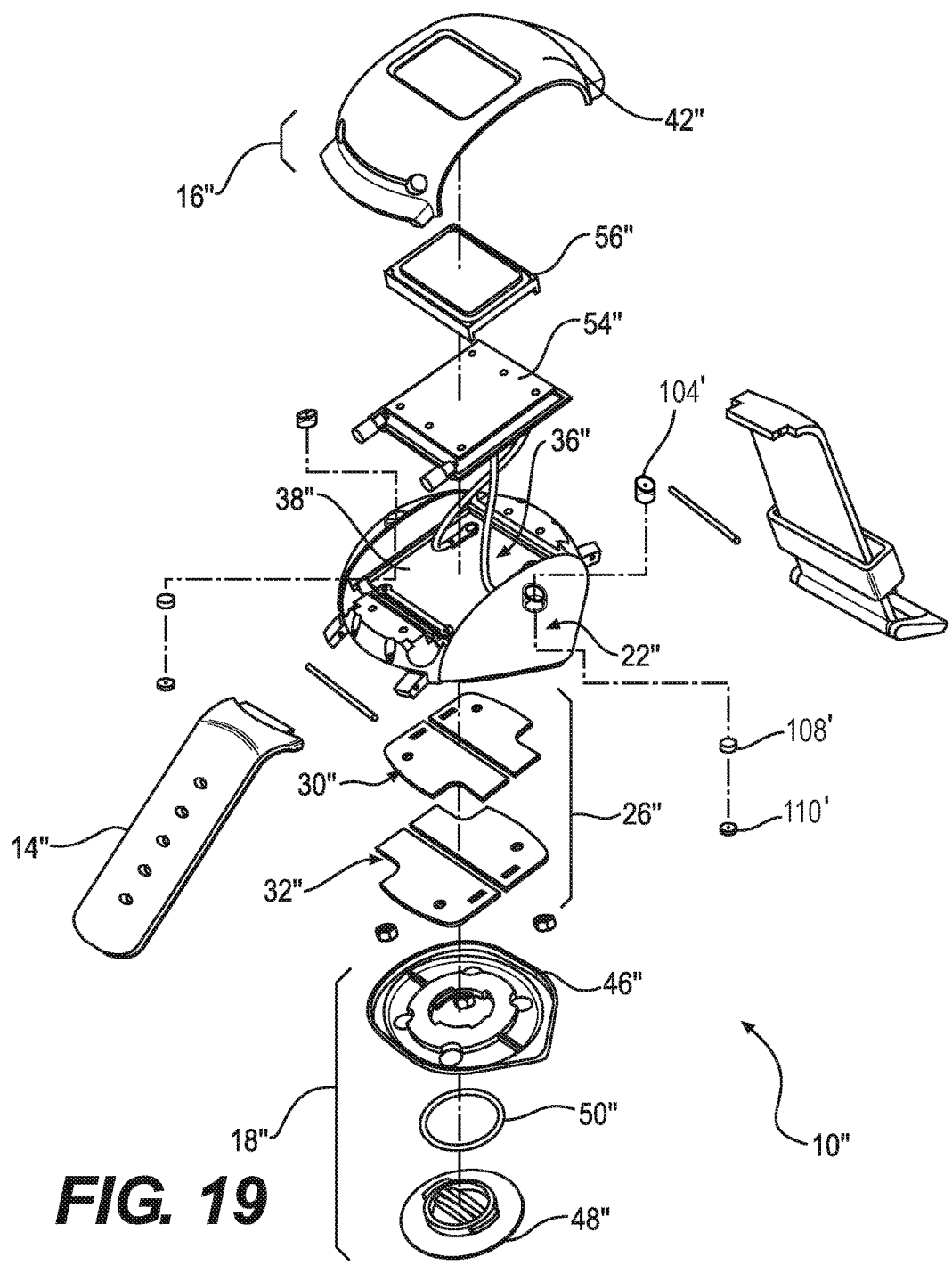
FIG. 19 is a top perspective view of the liquid powered device of FIG. 15, shown cut away to reveal the internal components thereof.
Figure 20:
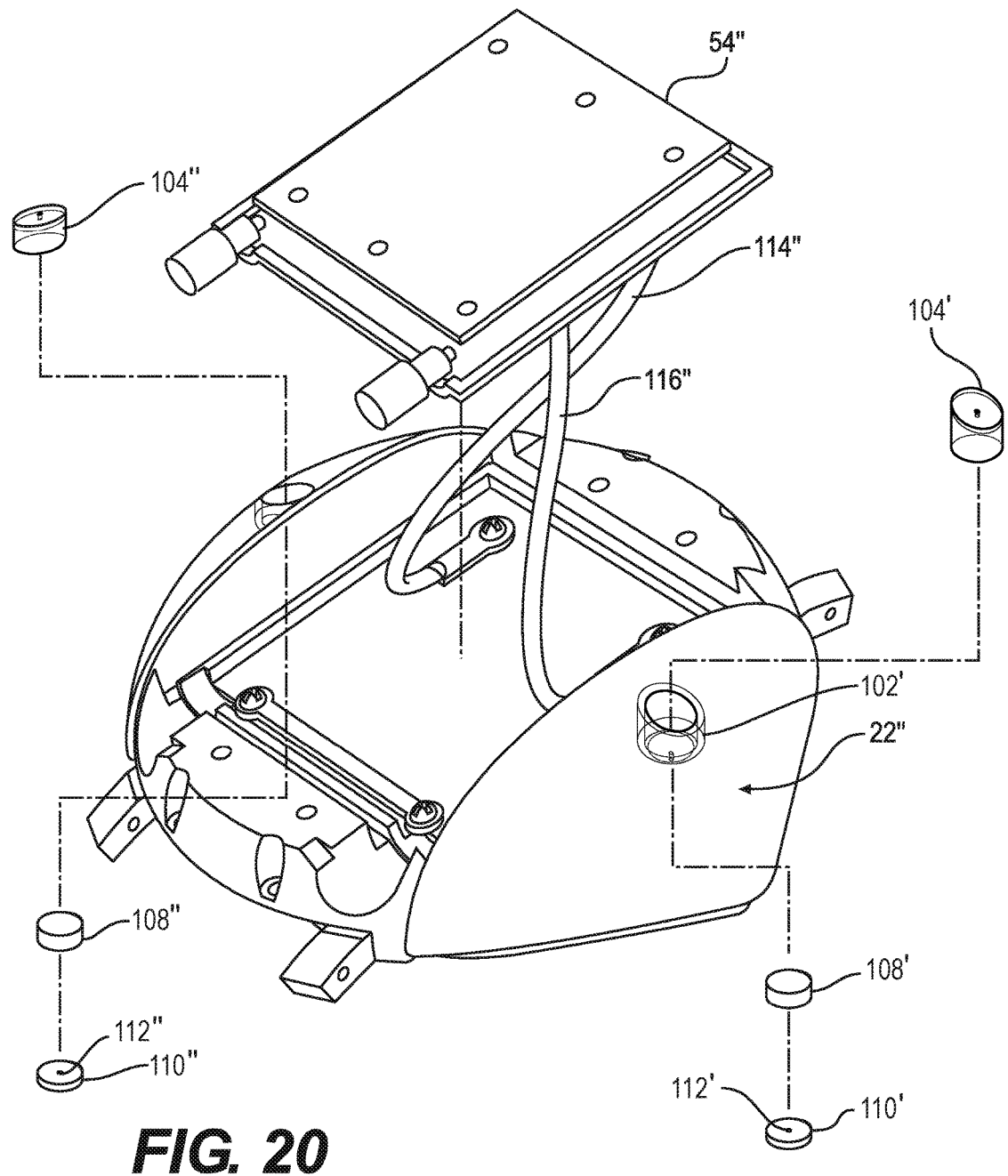
FIG. 20 is an exploded top, side perspective view of the liquid powered device of FIG. 15, with the face plate removed, revealing the pressure relief assembly.
Figure 21:
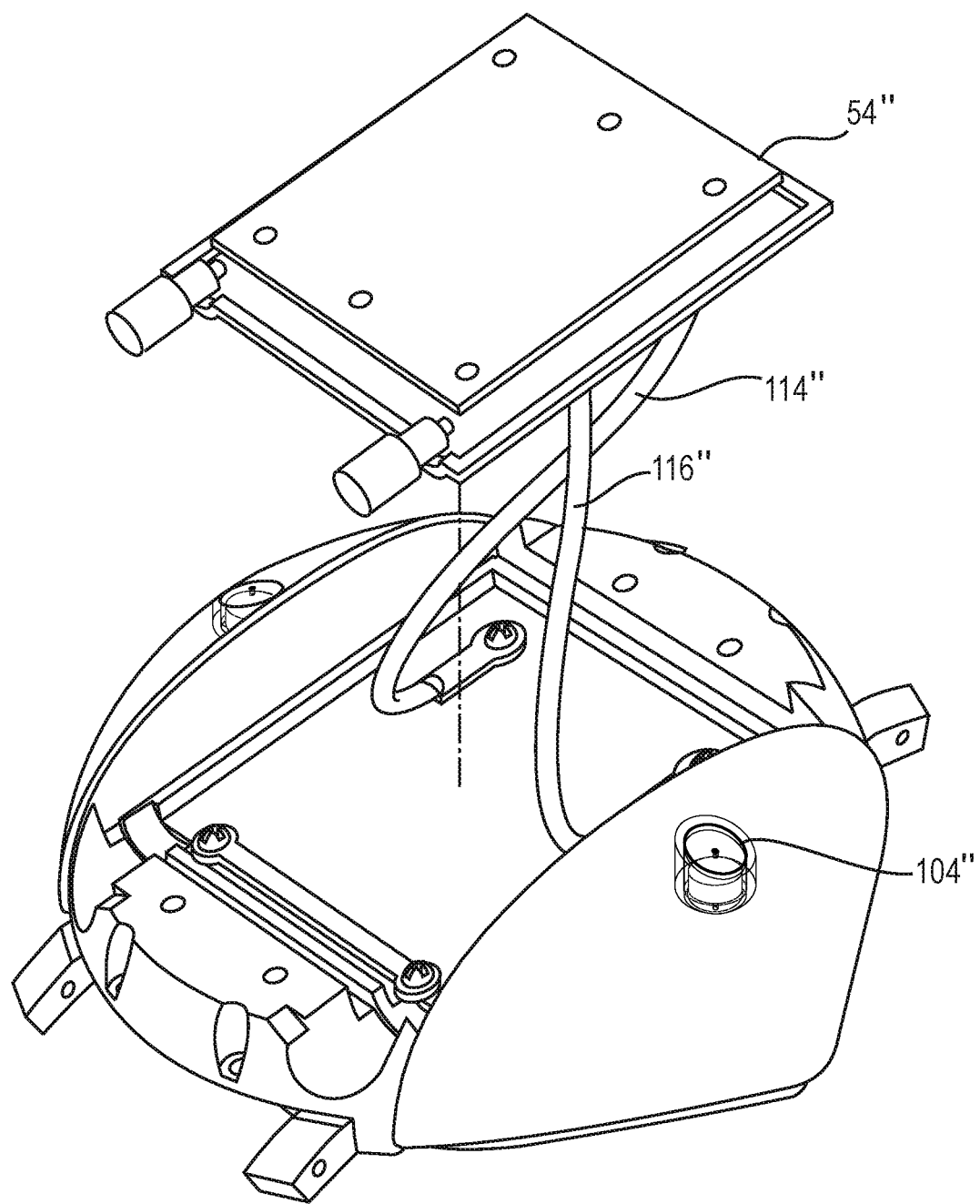
FIG. 21 is an exploded top, side perspective view of the liquid powered device of FIG. 15, showing an assembled pressure relief assembly, with the face plate missing.

As can be seen in FIG. 18, in this embodiment, the upper liquid seal member 20 has been eliminated. The liquid tank assembly 22 provides the liquid seal between the back plate 46" and the liquid tank assembly 22", which prevents the water from leaking through to the upper liquid seal area 36". Furthermore, conductive screws 60", 62", 68 keep water under pressure so that water does not leak out at the location of their attachment to the liquid tank.

Elimination of the upper liquid seal member 20 minimizes parts and reduces the cost of manufacturing. It also provides the capability for the liquid powered watch to be as thin as possible.

FIGS. 18-22 illustrate the liquid powered device, designated generally as 10". The device 10" includes a housing assembly, designated generally as 12"; that is configured to be worn on the wrist of a user via a wristband 14". The device 10", embodied as a watch in this preferred embodiment. The housing assembly 12" includes a front portion 16" and a back portion 18". Although the housing assembly 12" is shown in the figures as being clear, it can be clear or transparent. The front portion 16" includes an upper liquid seal member 20". A liquid tank assembly 22" is secured within the housing assembly 12". The liquid tank assembly 22" includes a fluid inlet 24". A power assembly 26" is secured within the liquid tank assembly 22". An electronic module assembly 28" is secured to the liquid tank assembly 22". The power assembly 26" is in fluid communication with the fluid inlet 24" to provide filling of the power assembly 26".

The power assembly 26" includes two sets of metal elements 30", 32". Each set of metal elements is configured to produce an electrolyte charge. The two sets are divided into separate chambers to total two power cells. In each chamber, each set includes a pair of metallic elements that are polar opposites which react with electrolyte solution to generate an electric charge that can power the electronic module. Typically these elements or plates are formed of copper and zinc. Thus, during operation the device 10" is filled with an electrolyte solution 30" typically water. Thus, electricity is generated as well known by those familiar with liquid batteries. The electronic module 54" and the liquid tank assembly 22" are connected by wires 114" and 116".

The liquid tank assembly 22" includes a divider 34" for separating the metal elements of each respective set 30", 32" of metal elements. The upper liquid seal member 20" cooperates with an upper liquid seal portion 36" of the liquid tank assembly 22" to provide a sealing engagement there between.

The upper liquid seal portion 36" includes an upper sealing surface 38" and a lower sealing surface 40". The upper sealing surface 38" cooperates with the upper liquid seal member 20" for sealing the electronic module assembly 28". The lower sealing surface 40" cooperates with the back portion 18" for sealing the power assembly 26".

The manner of sealing is preferably ultrasonic sealing for both sealing the electronic module assembly 28" and sealing the power assembly 26". However, alternatively sealing by glue can be utilized.

The front portion 16" preferably includes a face plate 42".

The back portion 18" of the housing assembly 12" includes a back plate 46" connected to the liquid tank assembly 22", a water cap 48", and a washer 50" positioned between the back plate 46" and the water cap 48". The back plate 46" may be glued or ultrasonically welded to the liquid tank assembly 22". The water cap 48" includes an indentation 52" for turning the water cap 48" for opening and closing the fluid inlet 24". Thus, in this preferred embodiment, the fluid inlet 24" is at the back portion 18" of the housing assembly 12". However, in alternate embodiments, the fluid inlet 24" may be formed at, for example, sidewalls of the liquid tank assembly 22".

The electronic module assembly 28" includes an electronic module element 54" operatively connected to a liquid crystal display (LCD) 56". The electronic module element 54" has a connecting plate 58" operatively connected at a back surface thereof. The power assembly 26" includes a pair of conducting screws 60", 62". Each set of metal elements 30", 32" is configured to produce an electrolyte charge. Each conductive screw 60", 62" of an associated set of metal elements 30", 32" is arranged and positioned to conduct electricity from its associated metal element to the connecting plate 58". The electronic module assembly 28" also includes a plurality of set buttons 64", 66".

Plate attachment screws/nuts 68", 70" attach the metal elements 30", 32" to the liquid tank assembly 22". Engagement elements 72" that extend from the sides of the liquid tank assembly 22" provide attachment of the wrist band 14".

Figure 22:
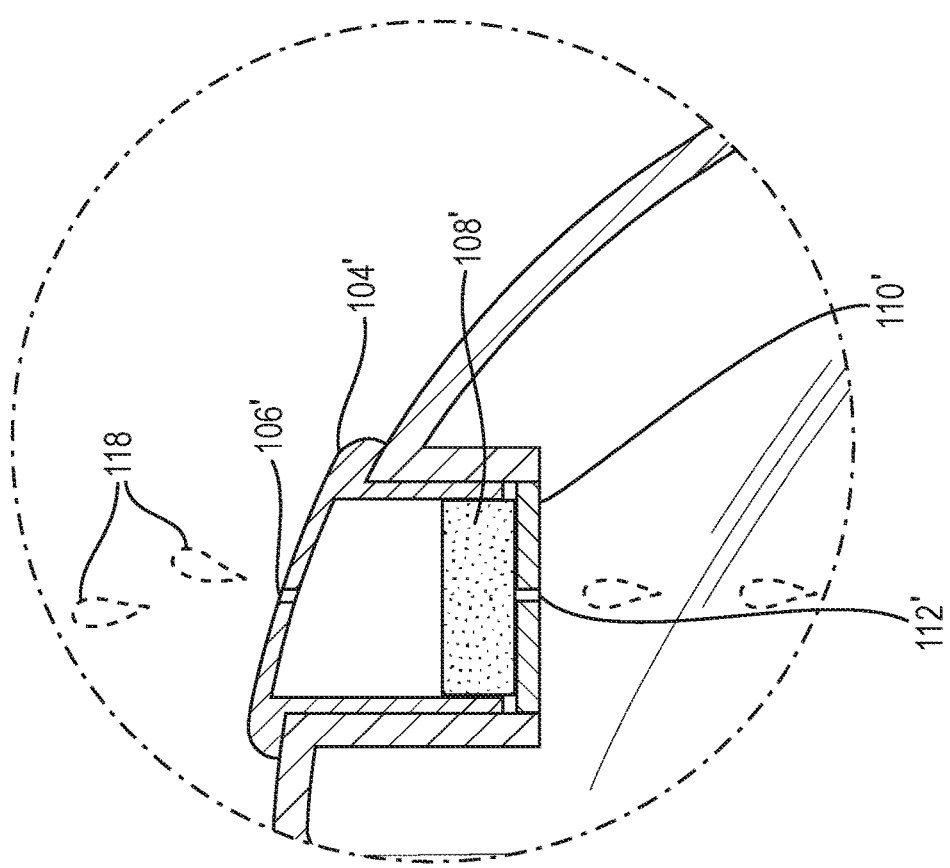
FIG. 22 is a cross-sectional side view of a portion of the liquid powered device of FIG. 15, showing the operation of the pressure relief assembly.
Figure 23:
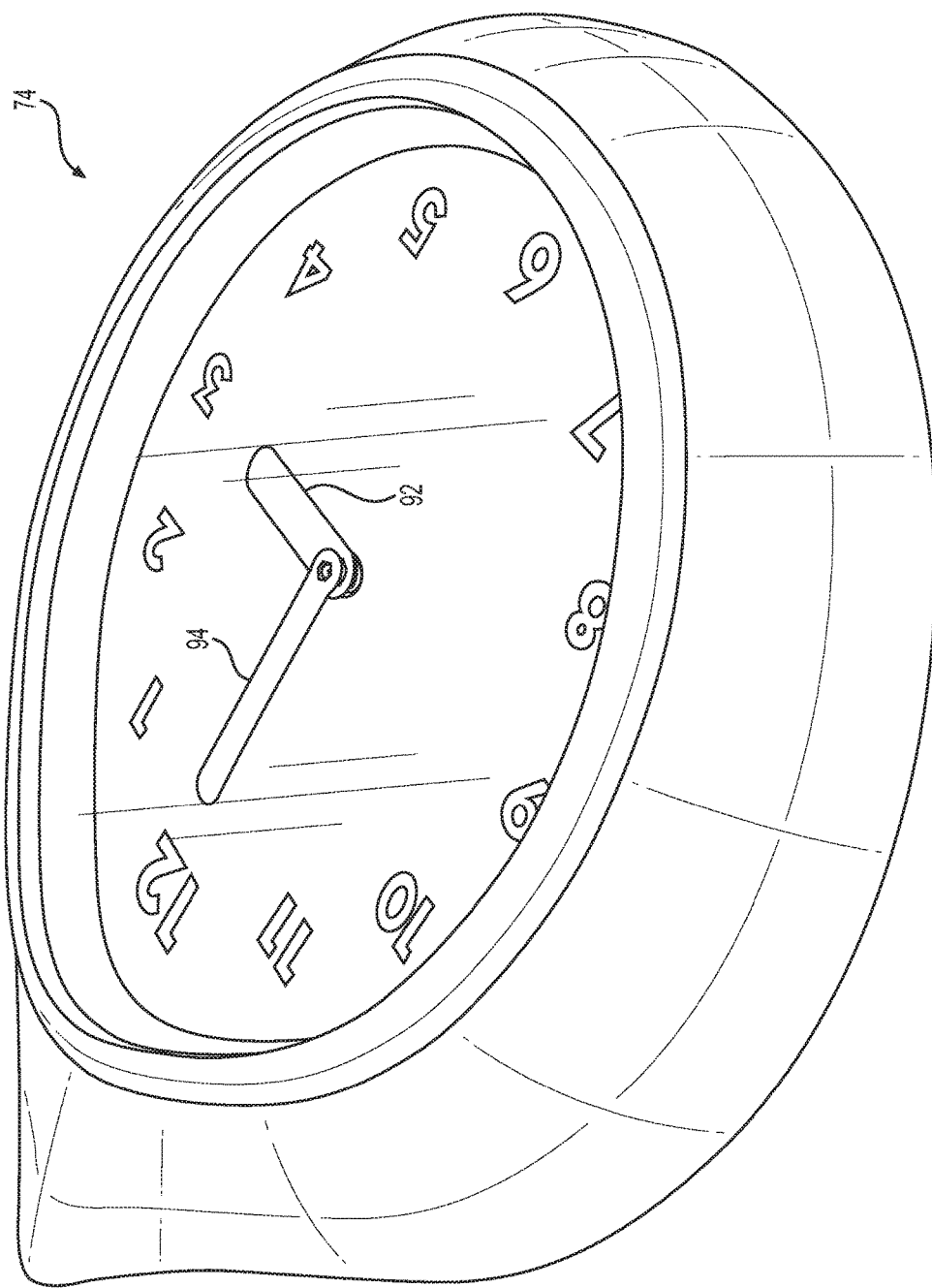
FIG. 23 is a perspective view of the liquid powered device of another embodiment of the present invention.
Figure 24:
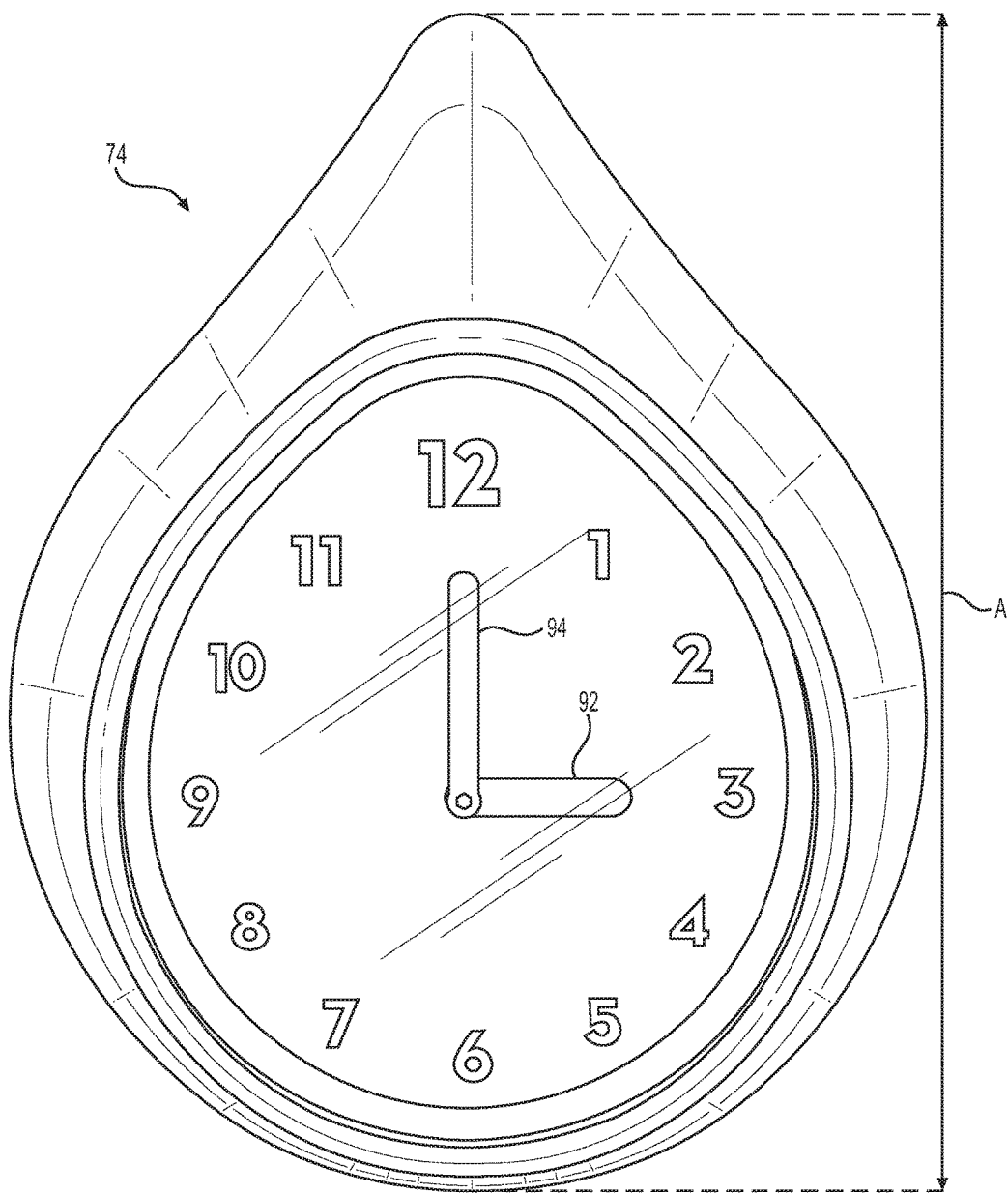
FIG. 24 is a front view of the liquid powered device of FIG. 23.
Figure 25:
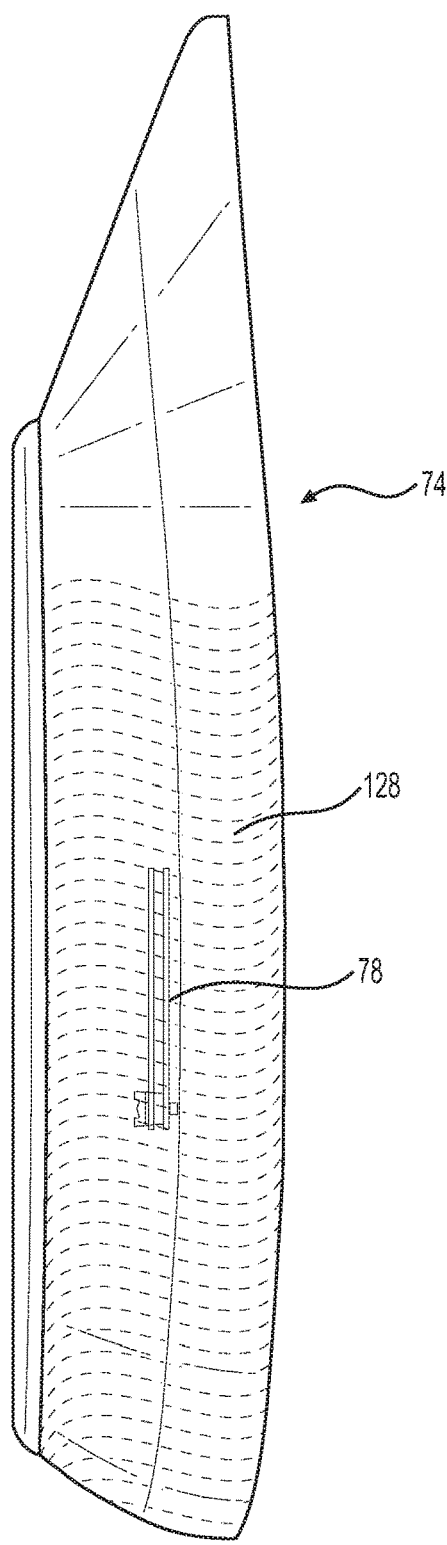
FIG. 25 is a side view of the liquid powered device of FIG. 23.
Figure 26:
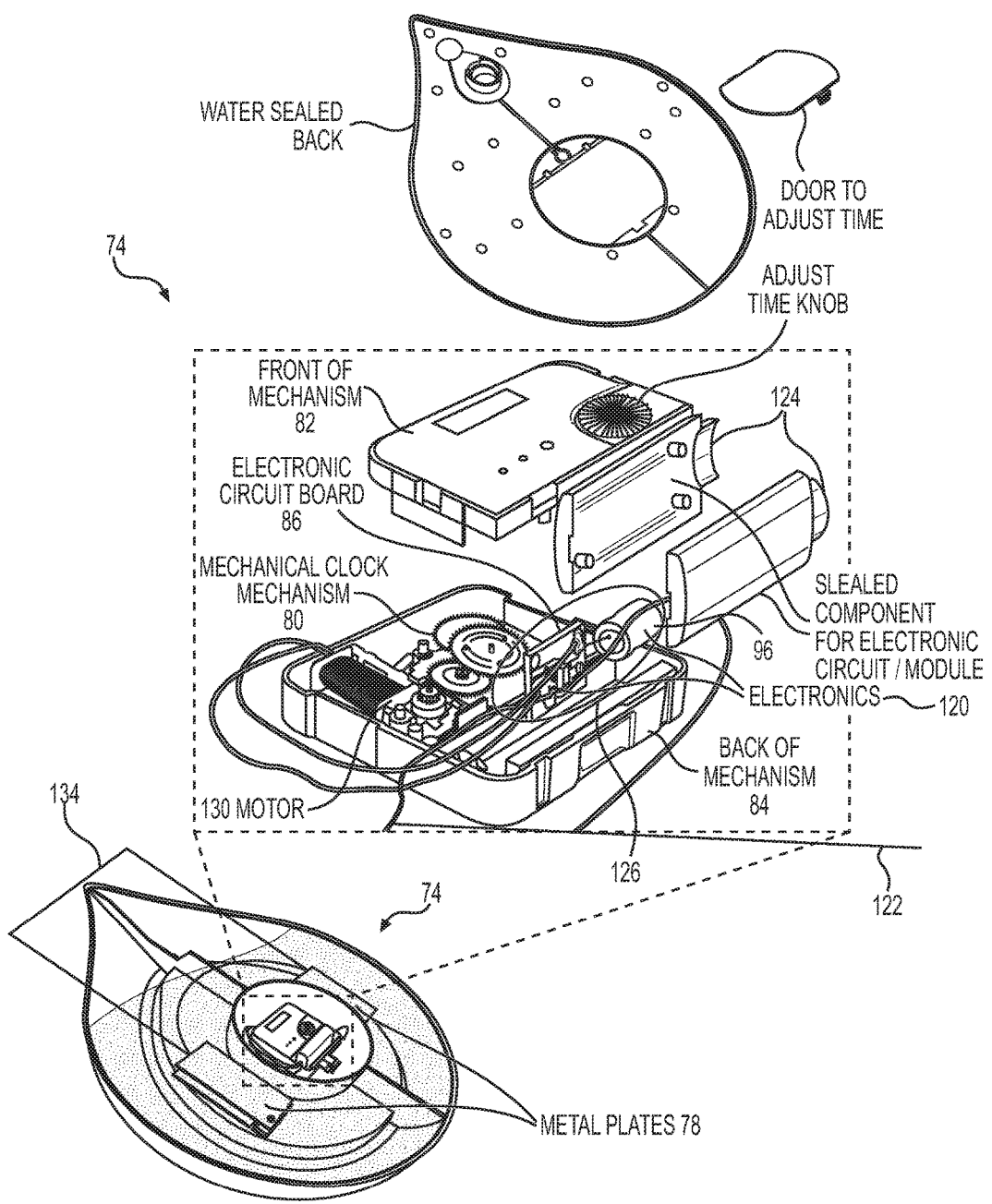
FIG. 26 is an exploded top perspective view of the liquid powered device of FIG. 23.
Figure 27:
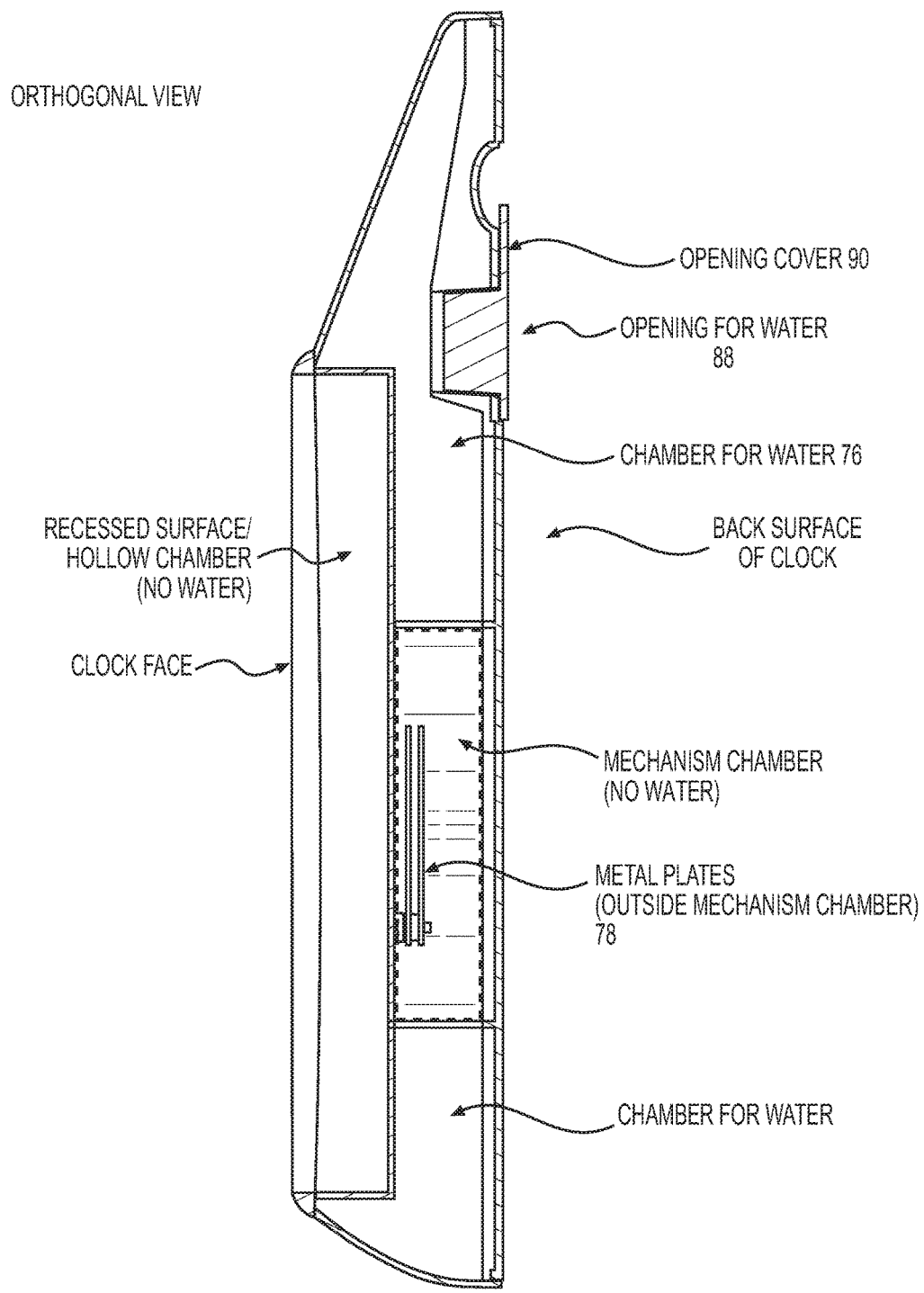
FIG. 27 is a side perspective view of the liquid powered device of FIG. 23, shown cut away to reveal the internal components thereof.

As can be seen in FIG. 22, a small amount of fluid can be released if the pressure exceeds a predetermined amount.

Referring now to FIGS. 23-27 the liquid powered device can be enlarged to be approximately 15 inches high (see line A in FIG. 24) and to hold approximately 7 cups of liquid which is utilized to power the clock 74. The advantage of this embodiment is that the clock 74 can be hung on the wall and provide time keeping capabilities without the need for an external electric plug and/or external batteries. As with the other embodiments, the user simply adds water to the clock's water tank, i.e. liquid tank assembly 76, and when the liquid encounters the metal plates 78 the clock 74 begins to operate. The element that provides the time is an analog mechanical clock mechanism 80. The two part housing for the mechanical clock mechanism 80 has a front 82 and back 84 and it holds a series of gears that moves the hour hand and minute hand. There is a motor 130 that drives the gears. Attached to the mechanism on the back side of the mechanism housing is an electronic module assembly 126 that converts the current produced when water is inserted into the water tank by the metal plates into power to run the clock 74. The water tank 76 includes a fill hole 88 and a water cap 90. A liquid tank assembly 76 is secured within the housing assembly 74. The liquid tank assembly includes the fluid inlet 88. An electronic module assembly 126 is secured within the water tight sealed housing 124. A mechanical clock mechanism 80 is secured to the liquid tank assembly in cavity where no liquid is stored. The power assembly 134 is in fluid communication with the fluid inlet 88 to provide filling of the power assembly.

The power assembly 134 includes two sets of the metal elements 78. Each set of metal elements is configured to produce an electrolyte charge. The two sets are divided into separate chambers to total two power cells. In each chamber, each set includes a pair of metallic elements that are polar opposites which react with electrolyte solution to generate an electric charge that can power the electronic module. Typically these elements or plates are formed of copper and zinc. Thus, during operation the device is filled with an electrolyte solution 128 typically water. Thus, electricity is generated as well known by those familiar with liquid batteries. The electronic module 120 that converts the current into a charge that the mechanical mechanism can use for power has an electronic circuit board and electronic components and are connected by wires 122 that are positioned into the water tank using a water tight seal so that it can connect to the power assembly and not allow water into the water tight compartment.

There is an hour hand 92 and a minute hand 94 that moves in a clockwise motion as is customary for a mechanical clock. There is no hand commonly known as the second hand. The constant friction that a second hand produces is too much for the liquid power source to power successfully. The invention will not work successfully with a second hand. Omission of the second hand provides the capability for the mechanism to successfully show the correct time.

The power generated by the liquid battery power source is approximately 3 Amps or under with a current which is insufficient to reliably and continuously power a mechanism that is driven with a motor 130 when a second hand is attached.

The invention claimed is:

1. A liquid powered device, comprising:
 a) a liquid tank assembly configured to be worn on a wrist of a user, said liquid tank assembly having a fluid inlet;
 b) a power assembly secured within said liquid tank assembly;
 c) an electronic module assembly secured to said liquid tank assembly;
 wherein said power assembly is in fluid communication with said fluid inlet to provide filling of said power assembly; and,
 d) a pressure relief assembly positioned within said liquid tank assembly for relief of undesired pressure therein, wherein said pressure relief assembly comprises:
  a pressure relief housing;
  a pressure relief top cap positioned on an upper end of said pressure relief housing, said pressure relief top cap having a top cap opening; and
  and a pressure relief element positioned within said pressure relief housing wherein said pressure relief top cap is formed integral with the liquid tank assembly.

2. The liquid powered device of claim 1, wherein said power assembly comprises two sets of metal elements, each set configured to produce an electrolyte charge.

3. The liquid powered device of claim 1, wherein said liquid tank assembly includes a divider for separating metal elements of each respective set of metal elements.

4. The liquid powered device of claim 1, wherein said liquid tank assembly includes a plurality of engagement elements for securing a wristband.

5. The liquid powered device of claim 1, wherein said electronic module assembly comprises an electronic module element operatively connected to an LCD.

6. The liquid powered device of claim 1, wherein said electronic module assembly comprises an electronic module element operatively connected to an LCD, said electronic module element having a connecting plate operatively connected at a back surface thereof; and wherein said power assembly includes a pair of conducting screws, said power assembly further comprising two sets of metal elements, each set configured to produce an electrolyte charge, wherein each said conductive screw of an associated set of metal elements is arranged and positioned to conduct electricity from its associated metal element to said connecting plate.

7. The liquid powered device of claim 6, wherein the two sets of metal elements are divided into separate chambers to total two power cells, and wherein screws and nuts connect metal elements to said liquid tank assembly.

8. The liquid powered device of claim 1, wherein said electronic module assembly includes a plurality of set buttons.

9. The liquid powered device of claim 1, wherein said liquid powered device comprises a watch.

10. The liquid powered device of claim 1, wherein said liquid tank assembly is one inch or less in thickness.

11. The liquid powered device of claim 1, wherein said pressure relief assembly comprises a semi porous membrane.

12. The liquid powered device of claim 1, wherein said pressure relief assembly comprises a pressure relief housing having a semi porous membrane positioned therein.

* * * * *